United States Patent
Hagihara et al.

(10) Patent No.: US 11,619,869 B2
(45) Date of Patent: Apr. 4, 2023

(54) LIGHT SOURCE APPARATUS AND PROJECTOR

(71) Applicant: SEIKO EPSON CORPORATION, Tokyo (JP)

(72) Inventors: Takehiko Hagihara, Azumino (JP); Masato Kadotani, Matsumoto (JP); Yuki Takahi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 17/226,903

(22) Filed: Apr. 9, 2021

(65) Prior Publication Data

US 2021/0318599 A1 Oct. 14, 2021

(30) Foreign Application Priority Data

Apr. 10, 2020 (JP) .............................. JP2020-071104

(51) Int. Cl.
*G03B 21/16* (2006.01)
*G03B 21/20* (2006.01)
*H04N 9/31* (2006.01)

(52) U.S. Cl.
CPC ........... *G03B 21/16* (2013.01); *G03B 21/204* (2013.01); *G03B 21/2013* (2013.01); *H04N 9/3161* (2013.01); *H04N 9/3164* (2013.01)

(58) Field of Classification Search
CPC .. G03B 21/16; G03B 21/2013; G03B 21/204; H04N 9/3161; H04N 9/3164; H04N 9/315; H04N 9/3144
See application file for complete search history.

(56) References Cited

U.S. PATENT DOCUMENTS

| 10,911,730 B1* | 2/2021 | Chien .................. H04N 9/3197 |
| 2014/0307232 A1 | 10/2014 | Sato et al. |
| 2017/0059973 A1 | 3/2017 | Yamaguchi |
| 2018/0059521 A1 | 3/2018 | Nishimori et al. |
| 2018/0292740 A1* | 10/2018 | Takagi ................... G03B 21/16 |
| 2019/0171092 A1* | 6/2019 | Yamashita .......... G03B 21/145 |
| 2021/0152793 A1* | 5/2021 | Usami ................... G03B 21/16 |

FOREIGN PATENT DOCUMENTS

| JP | 2009251370 A | * 10/2009 | ............. G03B 21/16 |
| JP | 2014-206581 A | 10/2014 | |
| JP | 2017-045002 A | 3/2017 | |
| JP | 2018-031848 A | 3/2018 | |
| JP | 2018-180107 A | 11/2018 | |

* cited by examiner

*Primary Examiner* — Magda Cruz
(74) *Attorney, Agent, or Firm* — Oliff PLC

(57) ABSTRACT

A light source apparatus includes first and second optical elements, a support member to which the elements are fixed and supported, a first heat dissipation member to which the first optical element is connected, a second heat dissipation member to which heat of the second optical element is transferred, a heat transport member transporting the heat of the second optical element to the second heat dissipation member, and a cooling fan sending a cooling gas to the first and second heat dissipation members. The first heat dissipation member is on the opposite side from the direction toward which the light outputted from the first optical element travels. The second heat dissipation member is adjacent to the first heat dissipation member with a gap. The second heat dissipation member overlaps with the first heat when viewed along a flow direction of the cooling gas sent thereto.

11 Claims, 10 Drawing Sheets

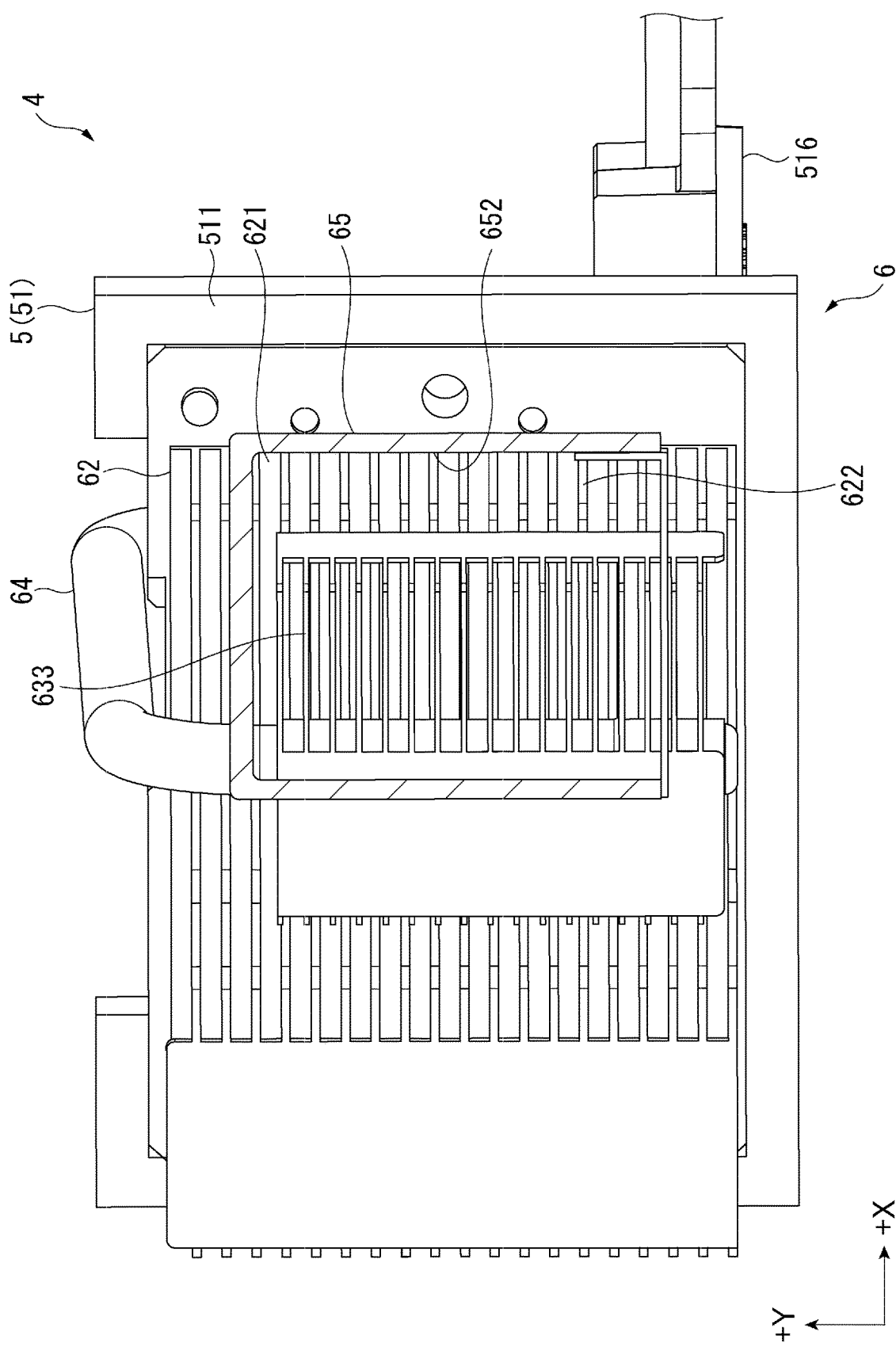

LIGHT SOURCE APPARATUS AND PROJECTOR

The present application is based on, and claims priority from JP Application Serial Number 2020-071104, filed Apr. 10, 2020, the disclosure of which is hereby incorporated by reference herein in its entirety.

BACKGROUND

1. Technical Field

The present disclosure relates to a light source apparatus and a projector.

2. Related Art

There has been a known light source apparatus capable of cooling the light source (see JP-A-2018-180107 and JP-A-2017-45002, for example).

The light source apparatus described in JP-A-2018-180107 includes a main body section, a light source, a cooler, and a fluorescence emitter. The light source is accommodated in the main body section, and the fluorescence emitter is supported by the main body section. The fluorescence emitter includes a phosphor layer, a substrate that supports the phosphor layer, and a reflection layer provided between the phosphor layer and the substrate, and the substrate is in direct contact with the main body section. The cooler includes a heat sink and a cooling fan, and the heat sink has a support surface that supports the light source and a plurality of fins provided on the opposite side from the support surface. The heat sink is thermally connected to the outer surface of the main body section, and not only heat of the light source but heat of the fluorescence emitter are transferred to the heat sink. The cooling fan sends a cooling gas to the plurality of fins to cool the heat sink and in turn the light source and the fluorescence emitter.

The light source apparatus provided in a projector described in JP-A-2017-45002 is formed of a light source unit and a cooling fan. The light source unit is configured to have a substantially box-like shape and includes LEDs (light emitting diodes) corresponding to three colors, red, green, and blue, and the LEDs are each provided with a heat dissipation member. Among the heat dissipation members, the heat dissipation member provided at the red LED includes a heat receiver, a heat pipe, and heat dissipation fins, and the heat pipe connects the heat receiver connected to the red LED to the heat dissipation fins. The same holds true for the heat dissipation member provided at the green LED. The heat dissipation fins of each of the heat dissipation members are arranged substantially linearly with respect to the direction in which the cooling fan sends the air, and the cooling air sent by the cooling fan cools the heat dissipation members and in turn the color LEDs.

However, in a configuration in which a single heat sink to which heat from two cooling targets is transferred is cooled by a cooling gas sent from a single cooling fan, as in the light source apparatus described in JP-A-2018-180107, it is difficult to adjust the cooling balance between the cooling targets.

In view of the difficulty described above, it is conceivable as in the light source apparatus described in JP-A-2017-45002 that each optical element is provided with a heat pipe and heat dissipation fins and a single cooling fan sends cooling air to the heat dissipation fins. The configuration described above, however, has a problem of an increase in the size of the entire light source apparatus.

SUMMARY

A light source apparatus according to a first aspect of the present disclosure includes a first optical element that outputs light, a second optical element that outputs light, a support member to which the first optical element and the second optical element are fixed and which supports the first optical element and the second optical element, a first heat dissipation member to which the first optical element is connected in a heat transferable manner, a second heat dissipation member to which heat of the second optical element is transferred, a heat transport member that transports the heat of the second optical element to the second heat dissipation member, and a cooling fan that sends a cooling gas to both the first heat dissipation member and the second heat dissipation member. The first heat dissipation member is disposed on an opposite side from a direction toward which the light outputted from the first optical element travels. The second heat dissipation member is so disposed as to be adjacent to the first heat dissipation member with a gap therebetween. At least part of the second heat dissipation member overlaps with the first heat dissipation member when viewed along a flow direction of the cooling gas sent to the first heat dissipation member and the second heat dissipation member.

A projector according to a second aspect of the present disclosure includes the light source apparatus described above, a light modulator that modulates light outputted from the light source apparatus, and a projection optical apparatus that projects the light modulated by the light modulator.

BRIEF DESCRIPTION OF THE DRAWINGS

FIG. 10 shows the positional relationship of the cross section of the cooling fan taken along the line X-X shown in FIG. 9 with the first heat dissipation member and the second heat dissipation member.

DESCRIPTION OF EXEMPLARY EMBODIMENTS

An embodiment of the present disclosure will be described below with reference to the drawings.

Schematic Configuration of Projector

Figure 1:
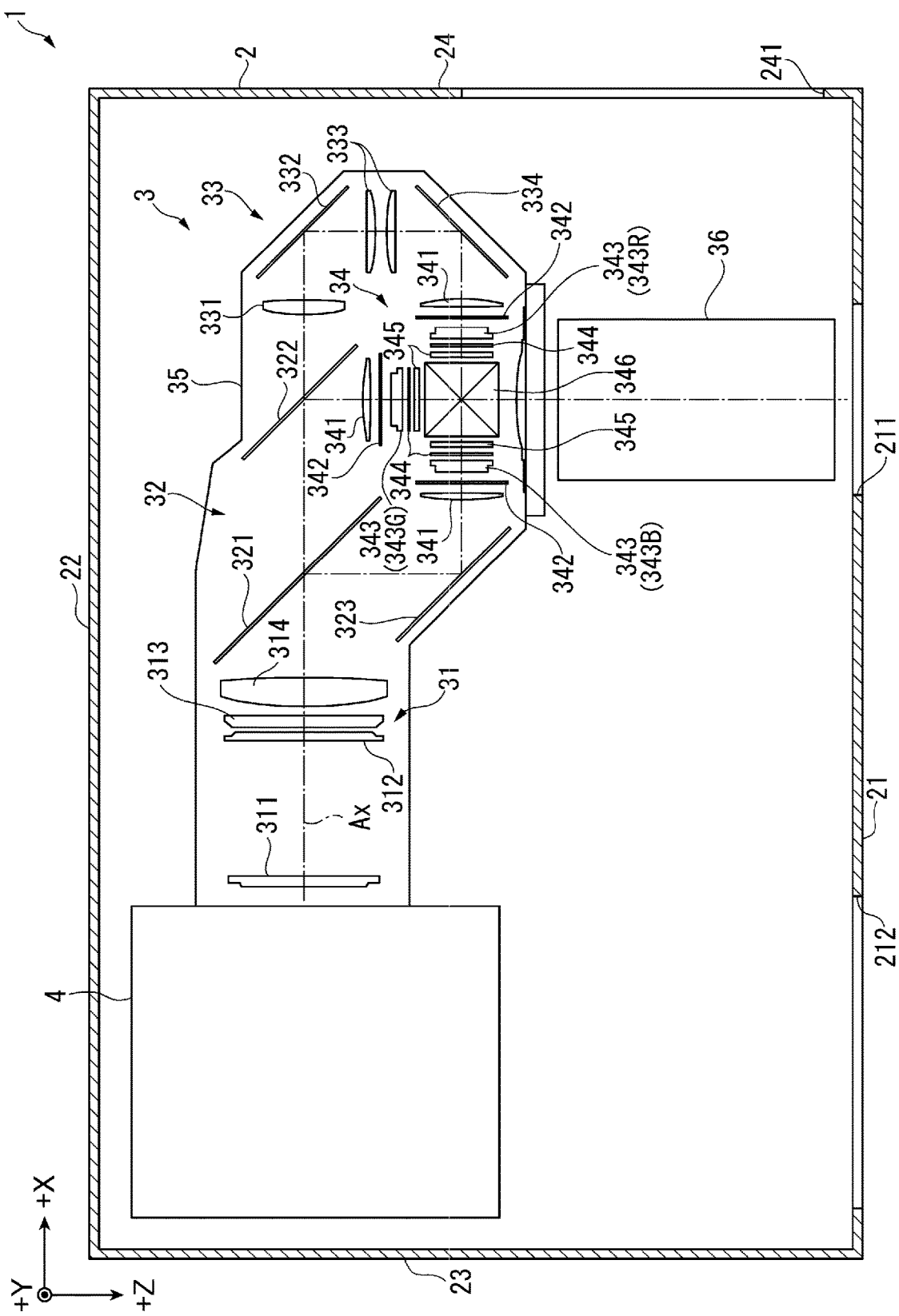
FIG. 1 is a diagrammatic view showing the configuration of a projector according to an embodiment.

FIG. 1 is a diagrammatic view showing the configuration of a projector 1 according to the present embodiment.

The projector 1 according to the present embodiment modulates light outputted from a light source to form an image according to image information and enlarges and projects the formed image on a projection receiving surface, such as a screen. The projector 1 includes an exterior enclosure 2 and an image projection apparatus 3, as shown in FIG. 1. In addition to the components described above, the projector 1 includes, although not shown, a power supply that supplies electronic parts that form the projector 1 with electric power, a controller that controls the action of the projector 1, and a cooler that cools a cooling target that forms the projector 1.

Configuration of Exterior Enclosure

The exterior enclosure 2 forms the exterior of the projector 1 and accommodates the image projection apparatus 3, the power supply, the controller, and the cooler.

The exterior enclosure 2 has a front surface section 21, a rear surface section 22, a left side surface section 23, and a right side surface section 24. Although not shown, the exterior enclosure 2 includes a top surface section that connects one-side ends of the surface sections 21 to 24 to each other and a bottom surface section that connects the-other-side ends of the surface sections 21 to 24 to each other. The exterior enclosure 2 is formed, for example, in a substantially box-like shape.

The right side surface section 24 has an intake port 241. The intake port 241 introduces the air outside the exterior enclosure 2 to the interior of the exterior enclosure 2. The intake port 241 may be provided with a filter that traps dust contained in the air passing through the intake port 241.

The front surface section 21 has a passage port 211 located substantially at the center of the front surface section 21. Light projected from a projection optical apparatus 36, which will be described later, passes through the passage port 211.

The front surface section 21 has a discharge port 212 located in the front surface section 21 in a position shifted toward the left side surface section 23. Air having cooled the cooling target provided in the exterior enclosure 2 is discharged via the discharge port 212 out of the exterior enclosure 2.

In the following description, three directions perpendicular to one another are called directions +X, +Y, and +Z. It is assumed in the present embodiment that the direction +X is the direction from the left side surface section 23 toward the right side surface section 24, the direction +Y is the direction from the bottom surface section toward the top surface section, and the direction +Z is the direction from the rear surface section 22 toward the front surface section 21. The direction +Z is the direction in which the projection optical apparatus 36, which will be described later, projects light when viewed along the direction +Y.

Although not shown, it is assumed that the opposite direction from the direction +X is a direction −X, the opposite direction from the direction +Y is a direction −Y, and the opposite direction from the direction +Z is a direction −Z.

Configuration of Image Projection Apparatus

The image projection apparatus 3 forms an image according to image information inputted from the controller and projects the formed image. The image projection apparatus 3 includes a light source apparatus 4, a homogenizer 31, a color separator 32, a relay section 33, an image formation section 34, an optical part enclosure 35, and the projection optical apparatus 36.

The configuration of the light source apparatus 4 will be described later in detail.

The homogenizer 31 homogenizes light outputted from the light source apparatus 4. The homogenized light travels via the color separator 32 and the relay section 33 and illuminates a modulation region of each light modulator 343, which will be described later. The homogenizer 31 includes two lens arrays 311 and 312, a polarization converter 313, and a superimposing lens 314.

The color separator 32 separates the light incident from the homogenizer 31 into red light, green light, and blue light. The color separator 32 includes two dichroic mirrors 321 and 322 and a reflection mirror 323, which reflects the blue light separated by the dichroic mirror 321.

The relay section 33 is provided in the optical path of the red light, which is longer than the optical paths of the other color light, and suppresses loss of the red light. The relay section 33 includes a light-incident-side lens 331, relay lenses 333, reflection mirrors 332 and 334. In the present embodiment, the relay section 33 is provided in the optical path of the red light, but not necessarily. For example, the blue light may be configured to have an optical path longer than those of the other color light, and the relay section 33 may be provided in the optical path of the blue light.

The image formation section 34 modulates the red light, green light, and blue light incident thereon and combines the modulated red light, green light, and blue light with one another to form an image. The image formation section 34 includes three field lenses 341, three light-incident-side polarizers 342, three light modulators 343, three viewing angle compensators 344, and three light-exiting-side polarizers 345, which are provided in accordance with the incident color light, and one light combiner 346.

The light modulators 343 modulate the light outputted from the light source apparatus 4 in accordance with image information. The light modulators 343 include a light modulator 343R, which modulates the red light, a light modulator 343G, which modulates the green light, and a light modulator 343B, which modulates the blue light. The light modulators 343 are each formed of a transmissive liquid crystal panel, and the light-incident-side polarizers 342, the light modulators 343, and the light-exiting-side polarizers 345 form liquid crystal light valves.

The light combiner 346 combines the color light modulated by the light modulator 343B, the color light modulated by 343G, and the color light modulated by 343R with one another to form an image and outputs the formed image to the projection optical apparatus 36. In the present embodiment, the light combiner 346 is formed of a cross dichroic prism, but not necessarily, and can instead be formed, for example, of a plurality of dichroic mirrors.

The optical part enclosure 35 accommodates the sections 31 to 34 described above. An illumination optical axis Ax, which is the optical axis in the design stage, is set in the image projection apparatus 3, and the optical part enclosure 35 holds the sections 31 to 34 in predetermined positions on the illumination optical axis Ax. The light source apparatus 4 and the projection optical apparatus 36 are disposed in predetermined positions on the illumination optical axis Ax.

The projection optical apparatus 36 is a projection lens that enlarges and projects the image incident from the image formation section 34 on the projection receiving surface. That is, the projection optical apparatus 36 projects the light modulated by the light modulators 343. The projection optical apparatus 36 can, for example, be an assembled lens including a plurality of lenses and a tubular lens barrel that accommodates the plurality of lenses.

Configuration of Light Source Apparatus

Figure 2:
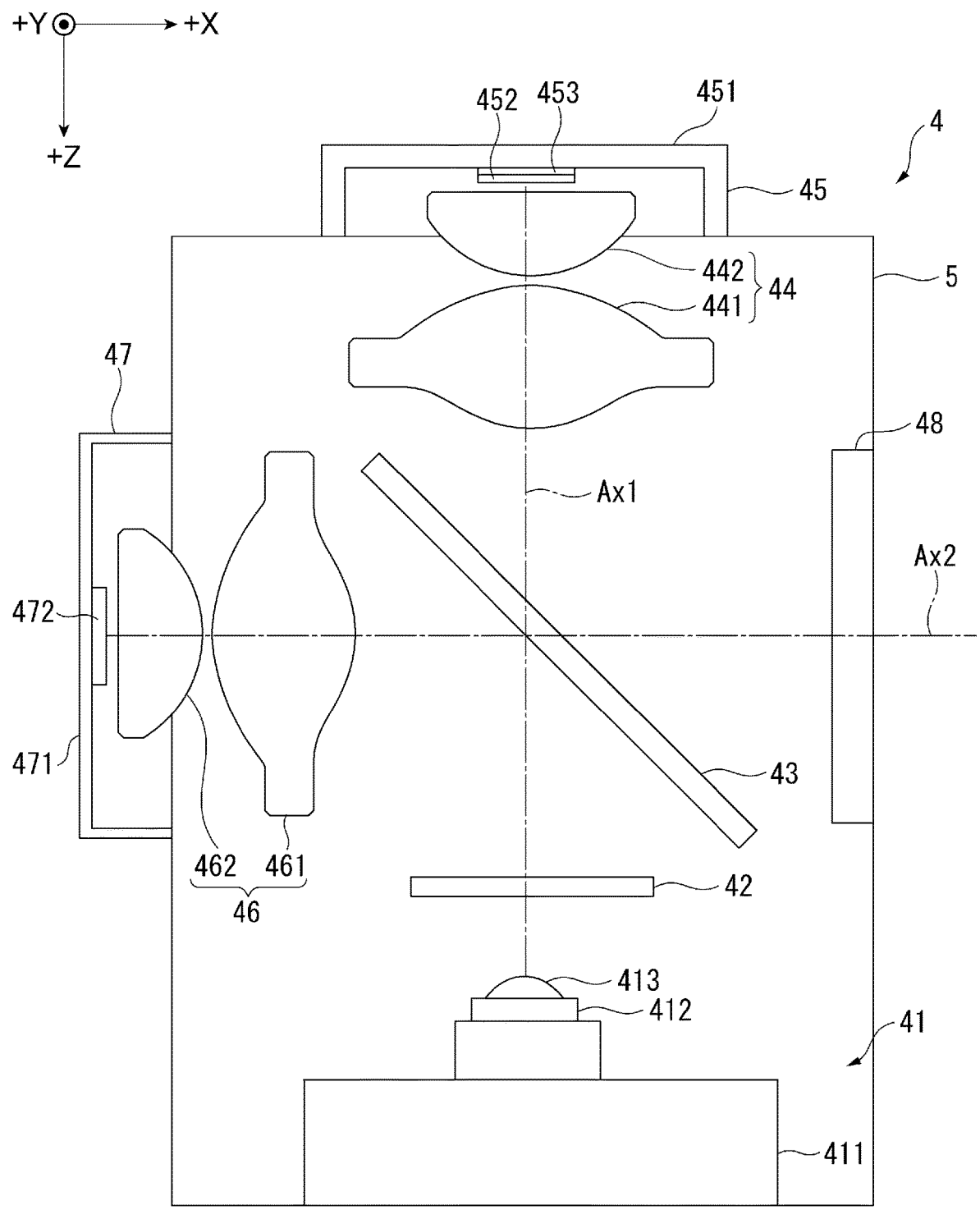
FIG. 2 is a diagrammatic view showing the configuration of a light source apparatus in the embodiment.

FIG. 2 is a diagrammatic view showing the configuration of the light source apparatus 4.

The light source apparatus 4 outputs light to the homogenizer 31. The light source apparatus 4 includes a light source 41, a diffusive transmission section 42, a light separator 43, a first light collector 44, a wavelength converter 45, a second light collector 46, a diffusive reflector 47, a phase retarder 48, and a support member 5, which supports the components described above, as shown in FIG. 2. In the present embodiment, the light source 41 corresponds to a first optical element, and the wavelength converter 45 corresponds to a second optical element. Although not shown in FIG. 2, the light source apparatus 4 further includes a cooler 6, which cools the light source 41 and the wavelength converter 45 (see FIG. 4).

The light source 41, the diffusive transmission section 42, the light separator 43, the first light collector 44, and the wavelength converter 45 are arranged along an illumination optical axis Ax1 set in the light source apparatus 4.

The light separator 43, the second light collector 46, the diffusive reflector 47, and the phase retarder 48 are arranged along an illumination optical axis Ax2, which is set in the light source apparatus 4 and perpendicular to the illumination optical axis Ax1. That is, the light separator 43 is disposed at the intersection of the illumination optical axis Ax1 and the illumination optical axis Ax2.

The illumination optical axis Ax2 coincides with the illumination optical axis Ax in the position of the lens array 311. In other words, the illumination optical axis Ax2 is set as an extension of the illumination optical axis Ax.

Configuration of Light Source

The light source 41 includes a substrate 411, a light emitter 412, and a collimator lens 413. The light source 41 is an optical device that outputs light.

The substrate 411 supports the light emitter 412 and the collimator lens 413. A first heat dissipation member 62 (see FIG. 4), which will be described later, is connected in a heat transferable manner to a surface of the substrate 411 that is the opposite surface from the surface on which the light emitter 412 and the collimator lens 413 are disposed.

The light source 412 outputs light. Although not shown, the light emitter 412 is formed of a plurality of semiconductor lasers that each output blue light.

The collimator lens 413 parallelizes the light outputted from the light emitter 412.

Configuration of Diffusive Transmission Section

The diffusive transmission section 42 diffuses light incident thereon to homogenize the illuminance distribution of the light that exits out thereof. The diffusive transmission section 42 can, for example, have a configuration including a hologram, a configuration in which a plurality of lenslets are arranged in a plane perpendicular to the optical axis, or a configuration in which a light passage surface is a rough surface.

In place of the diffusive transmission section 42 the light source apparatus 4 may employ a homogenizer optical element including a pair of multi-lens arrays. On the other hand, when the diffusive transmission section 42 is employed, the distance from the light source 41 to the light separator can be reduced as compared with the case where the homogenizer optical element is employed.

Configuration of Light Separator

The light having exited out of the diffusive transmission section 42 enters the light separator 43.

The light separator 43 has the function of a half-silvered mirror that transmits part of the light incident thereon from the light source 41 via the diffusive transmission section 42 and reflects the remaining light. The light separator 43 further has the function of a dichroic mirror that transmits the blue light incident from the diffusive reflector 47 and reflects light incident from the wavelength converter 45 and having wavelengths longer than the wavelength of the blue light.

In a detailed description, the light separator 43 transmits first partial light that is part of the blue light incident from the diffusive transmission section 42 to cause the transmitted light to enter the first light collector 44 and reflects second partial light that is the remaining blue light to cause the reflected light to enter the second light collector 46.

In the present embodiment, the light separator 43 is so configured that the amount of first partial light is greater than the amount of second partial light in consideration of light absorbed by the wavelength converter 46, but not necessarily. The amount of first partial light may be equal to or smaller than the amount of second partial light.

Configuration of First Light Collector

The first light collector 44 collects the first partial light having passed through the light separator 43 and causes the collected light to enter the wavelength converter 45. Further, the first light collector 44 parallelizes the light incident from the wavelength converter 45.

In the present embodiment, the first light collector 44 includes two lenses 441 and 442, but the number of lenses that form the first light collector 44 is not limited to two.

Configuration of Wavelength Converter

The wavelength converter 45 is an optical element that outputs light. The wavelength converter 45 converts the wavelength of the light incident thereon, diffuses the converted light in the opposite direction from the direction in which the light is incident on the wavelength converter 45, and outputs the diffused light. In a detailed description, the wavelength converter 45 is excited with the blue light incident thereon, diffuses the resultant fluorescence having wavelengths longer than the wavelength of the incident blue light, and outputs the diffused fluorescence toward the first light collector 44. That is, the wavelength converter 45 converts the light that is outputted from the light source 41 and belongs to a first wavelength band into light that belongs to a second wavelength band different from the first wavelength band. The light outputted from the wavelength converter 45 is fluorescence having a peak wavelength ranging, for example, from 500 to 700 nm.

The wavelength converter 45 includes a substrate 451, a wavelength conversion layer 452, and a reflection layer 453.

The substrate 451 is a plate-shaped element made of metal and supports the wavelength conversion layer 452 and the reflection layer 453. The substrate 451 is fixed to the support member 5, which will be described later, and a heat transport member 64, which will be described later, is connected to the substrate 451.

The wavelength conversion layer 452 is provided in a position on the substrate 451 that is the position where the wavelength conversion layer 452 faces the first light collector 44. The wavelength conversion layer 452 is a phosphor layer containing a phosphor that converts the wavelength of the blue light incident from the first light collector 44 into the fluorescence, which is non-polarized light, diffuses the fluorescence, and outputs the diffused fluorescence.

The reflection layer 453 is located on a side of the wavelength conversion layer 452 that is the opposite side from the blue light incident side and reflects the fluorescence incident from the wavelength conversion layer 452 toward the wavelength conversion layer 452.

The fluorescence outputted from the wavelength converter 45 passes through the first light collector 44 along the illumination optical axis Ax1 and is incident on the light separator 43. The fluorescence incident on the light separator 43 is reflected off the light separator 43 in the direction along the illumination optical axis Ax2 and enters the phase retarder 48.

Configuration of Second Light Collector

The second light collector 46 collects the second partial light reflected off the light separator 43 and incident on the second light collector 46 and causes the collected light to be incident on the diffusive reflector 47. Further, the second light collector 46 parallelizes the blue light incident from the diffusive reflector 47.

In the present embodiment, the second light collector 46 includes two lenses 461 and 462, but the number of lenses that form the second light collector 46 is not limited to two, as in the case of the first light collector 44.

Configuration of Diffusive Reflector

The diffusive reflector 47 includes a substrate 471, and a diffusive reflection layer 472, which is provided in a position on the substrate 471 that is the position where the diffusive reflector 47 faces the second light collector 46.

The diffusive reflector 472 diffusively reflects the blue light incident thereon from the second light collector 46 in such a way that the angle of diffusion of the diffused blue light is equal to that of the fluorescence outputted from the wavelength converter 45. That is, the diffusive reflection layer 472 does not convert the wavelength of the incident light but diffusively reflects the incident light.

The blue light reflected off the diffusive reflection layer 472 passes through the second light collector 46, then passes through the light separator 43, and enters the phase retarder 48. That is, the light that exits out of the light separator 43 and enters the phase retarder 48 is white light that is the mixture of the blue light and the fluorescence.

Configuration of Phase Retarder

The phase retarder 48 converts the white light incident from the light separator 43 into light that is the mixture of s-polarized light and p-polarized light. The thus converted white illumination light enters the homogenizer 31 described above.

Configuration of Support Member

Figure 3:
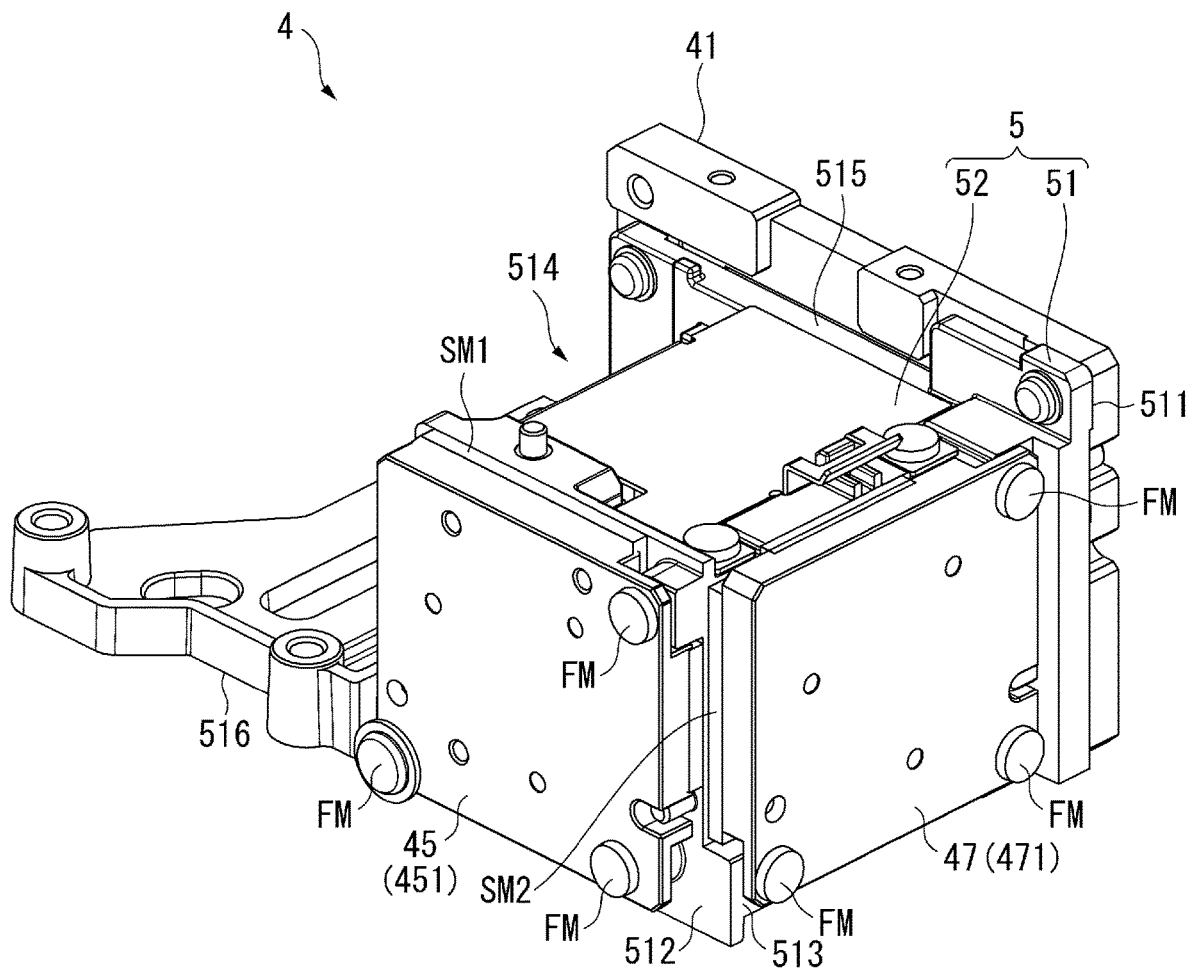
FIG. 3 is a perspective view showing a support member in the embodiment.
Figure 3:
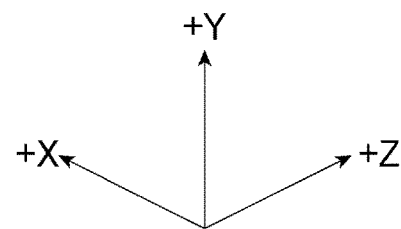

FIG. 3 is a perspective view showing the support member 5 provided in the light source apparatus 4.

As described above, the light source apparatus 4 includes the support member 5 shown in FIG. 3.

The support member 5 is a light source enclosure that has a substantially cubic shape and supports the light source 41, the diffusive transmission section 42, the light separator 43, the first light collector 44, the wavelength converter 45, the second light collector 46, the diffusive reflector 47, and the phase retarder 48.

The support member 5 includes a main body section 51 and a cover member 52.

Configuration of Main Body Section

The main body section 51 has a first side surface section 511, a second side surface section 512, a third side surface section 513, a fourth side surface section 514, a fifth side surface section 515, and a seat section 516. The main body section 51 includes, although not shown, fixing sections to which the diffusive transmission section 42, the light separator 43, the first light collector 44, the second light collector 46, and the phase retarder 48 are fixed.

The first side surface section 511 is a side surface section of the main body section 51 that is the side surface section facing the direction +Z. The light source 41 is attached to the first side surface section 511. Further, an end of a duct 61, which forms the cooler 6, which will be described later, that is the end facing the direction −Z is connected to the first side surface section 511.

The second side surface section 512 is a side surface section of the main body section 51 that is the side surface section facing the direction −Z. That is, the second side surface section 512 is a side surface section of the support member 5 that is the side surface section located on the opposite side from the first side surface section 511. The wavelength converter 45 is attached to the second side surface section 512. Specifically, the substrate 451 of the wavelength converter 45 is fixed to the second side surface section 512 via fixtures FM. That is, in the present embodiment, the wavelength converter 45 is an optical element that is not rotated by a driver, such as a motor, but is fixed to the support member 5. A seal member SM1, which is made, for example, of resin foam, is interposed between the substrate 451 and the second side surface section 512.

The third side surface section 513 is a side surface section of the main body section 51 that is the side surface section facing the direction −X. The diffusive reflector 47 is attached to the third side surface section 513. Specifically, the substrate 471 of the diffusive reflector 47 is fixed to the third side surface section 513 via fixtures FM. That is, in the present embodiment, the diffusive reflector 47 is an optical element that is not rotated by a driver, such as a motor, but is fixed to the support member 5. A seal member SM2, which is similar to the seal member SM1, is interposed between the substrate 471 and the third side surface section 513.

The fourth side surface section 514 is a side surface section of the main body section 51 that is the side surface section facing the direction +X. That is, the fourth side surface section 514 is a side surface section of the support member 5 that is the side surface section located on the opposite side from the third side surface section 513.

The fifth side surface section 515 is a side surface section of the main body section 51 that is the side surface section facing the direction +Y.

The fourth side surface section 514 and the fifth side surface section 515 are covered with the cover member 52, which is attached to the main body section 51.

The cover member 52 is provided with an opening 521 (see FIG. 6), although not shown in FIG. 3, which is located at a portion covering the fourth side surface section 514 and through which the light having exited out of the phase retarder 48 passes. The opening 521 is closed by a light transmissive member that is not shown.

The seat section 516 is located on a side of the main body section 51 that is the side facing the direction −Y. That is, the seat section 516 is aside surface section of the support member 5 that is the side surface section located on the opposite side from the fifth side surface section 515. The seat section 516 is fixed in a predetermined position on the exterior enclosure 2, for example, fixed to the inner surface of the exterior enclosure 2.

Configuration of Cooler

Figure 4:
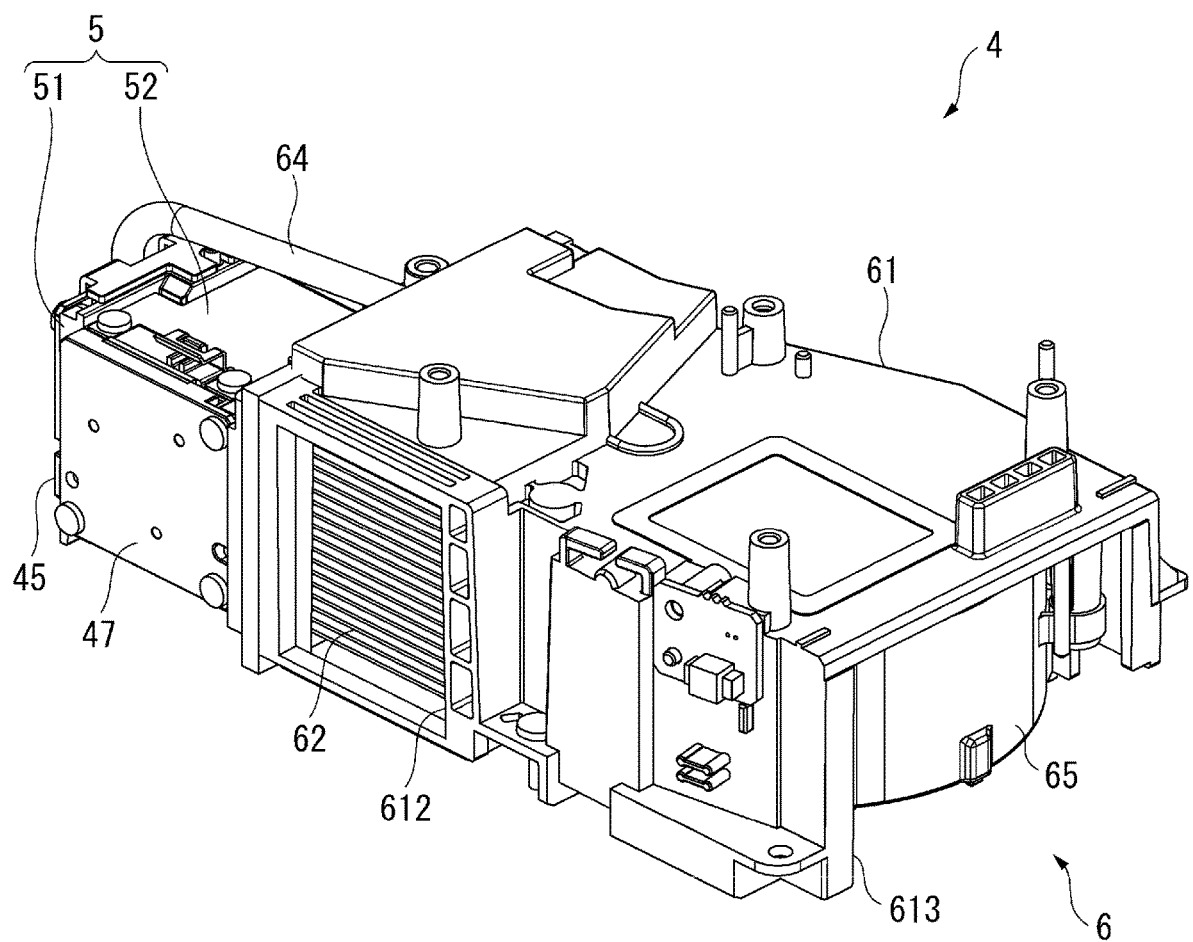
FIG. 4 is a perspective view showing a cooler in the embodiment.
Figure 4:
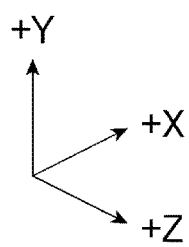
Figure 5:
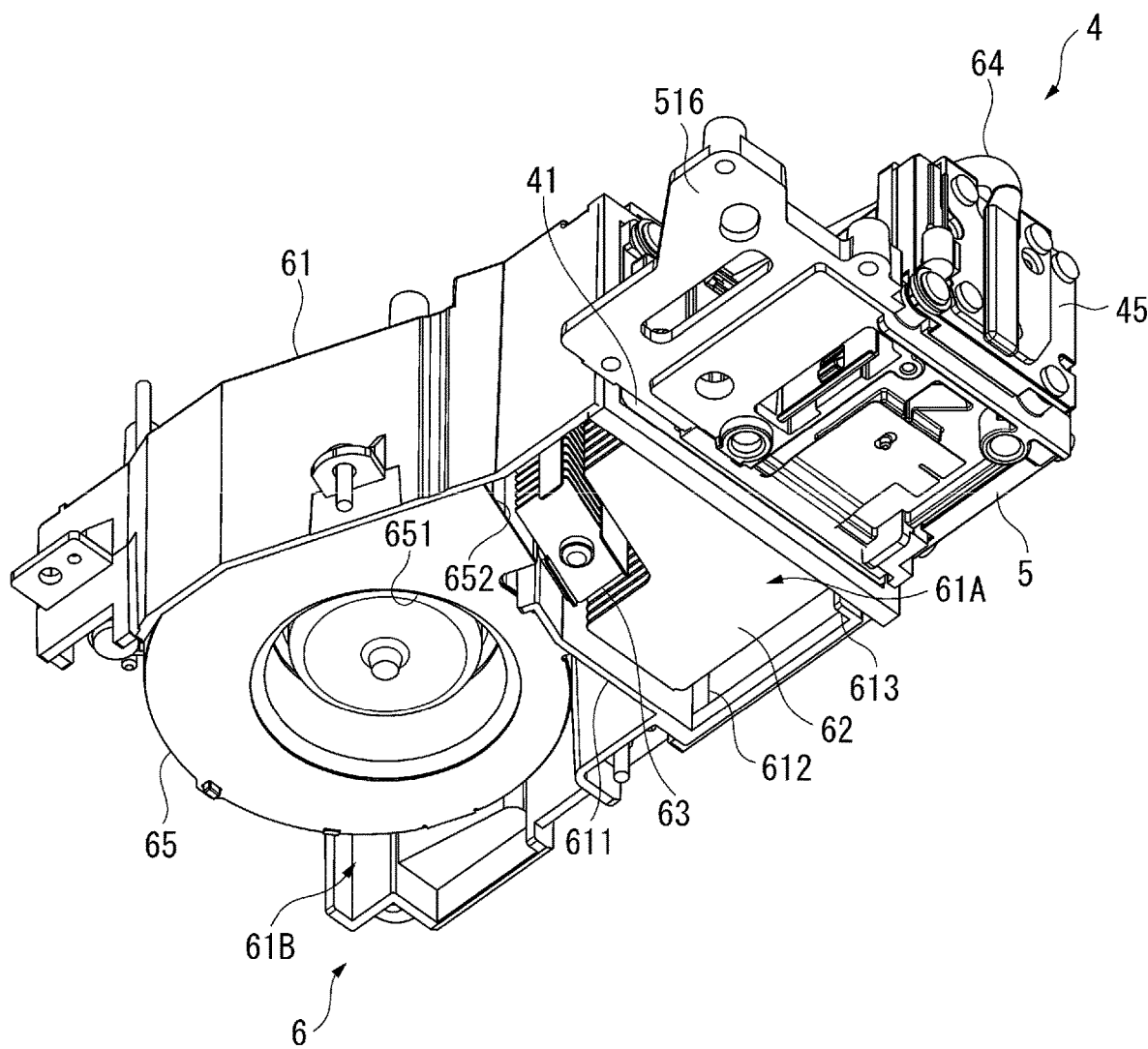
FIG. 5 is another perspective view showing the cooler in the embodiment.
Figure 5:
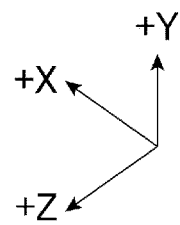

FIGS. 4 and 5 are perspective views showing the cooler 6 provided in the light source apparatus 4. In a detailed description, FIG. 4 is a perspective view of the cooler 6 viewed in the directions +Y and +Z, and FIG. 5 is a perspective view of the cooler 6 viewed in the directions −Y and −Z.

As described above, the light source apparatus 4 includes the cooler 6 shown in FIGS. 4 and 5.

The cooler 6 cools the light source 41 and the wavelength converter 45 fixed to the support member 5. Specifically, the cooler 6 cools the light source 41 and the wavelength converter 45 with a cooling gas sent from a cooling fan 65, which will be described later.

Figure 6:
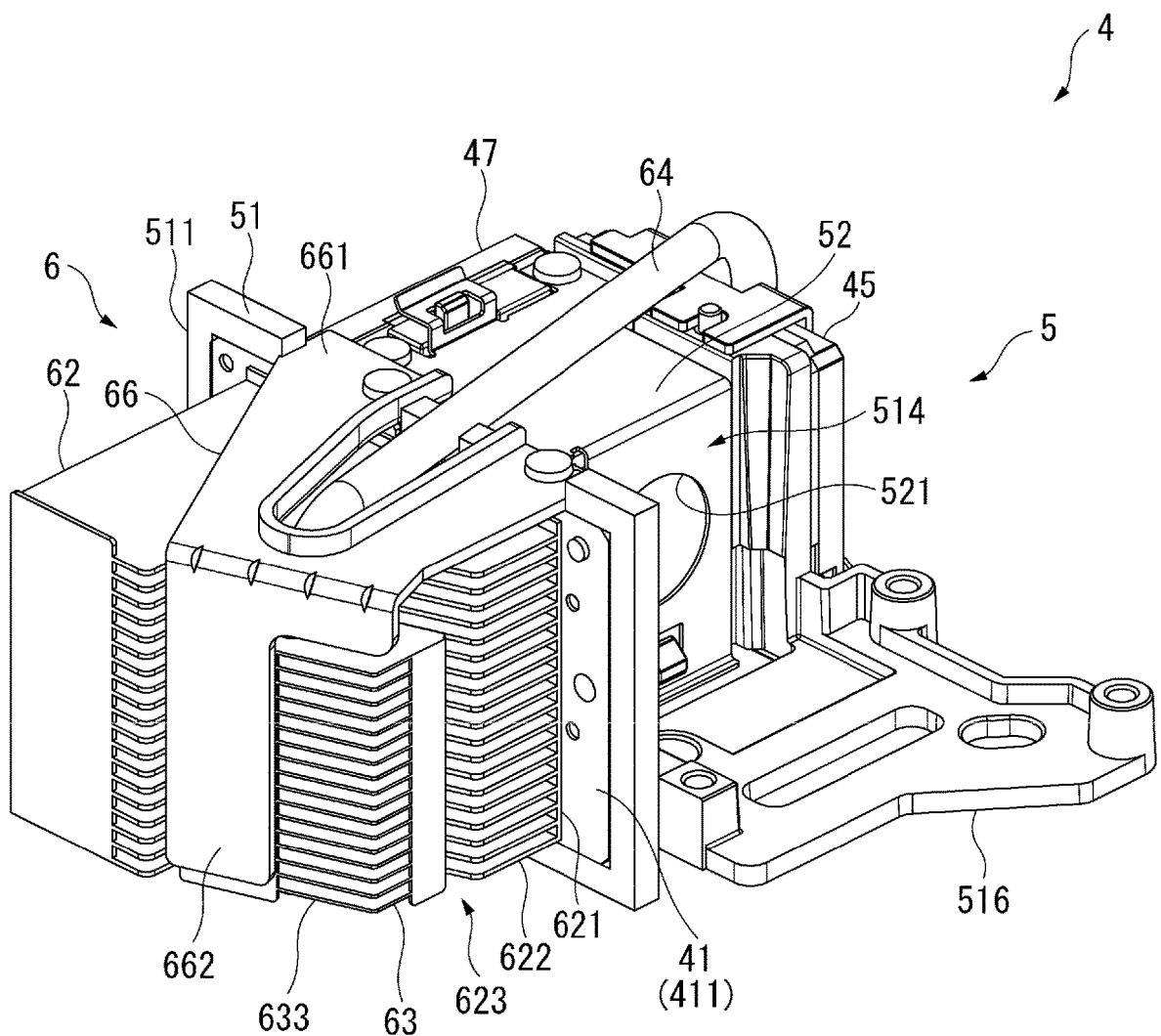
FIG. 6 is a perspective view showing the cooler excluding a duct and a cooling fan in the embodiment.
Figure 7:
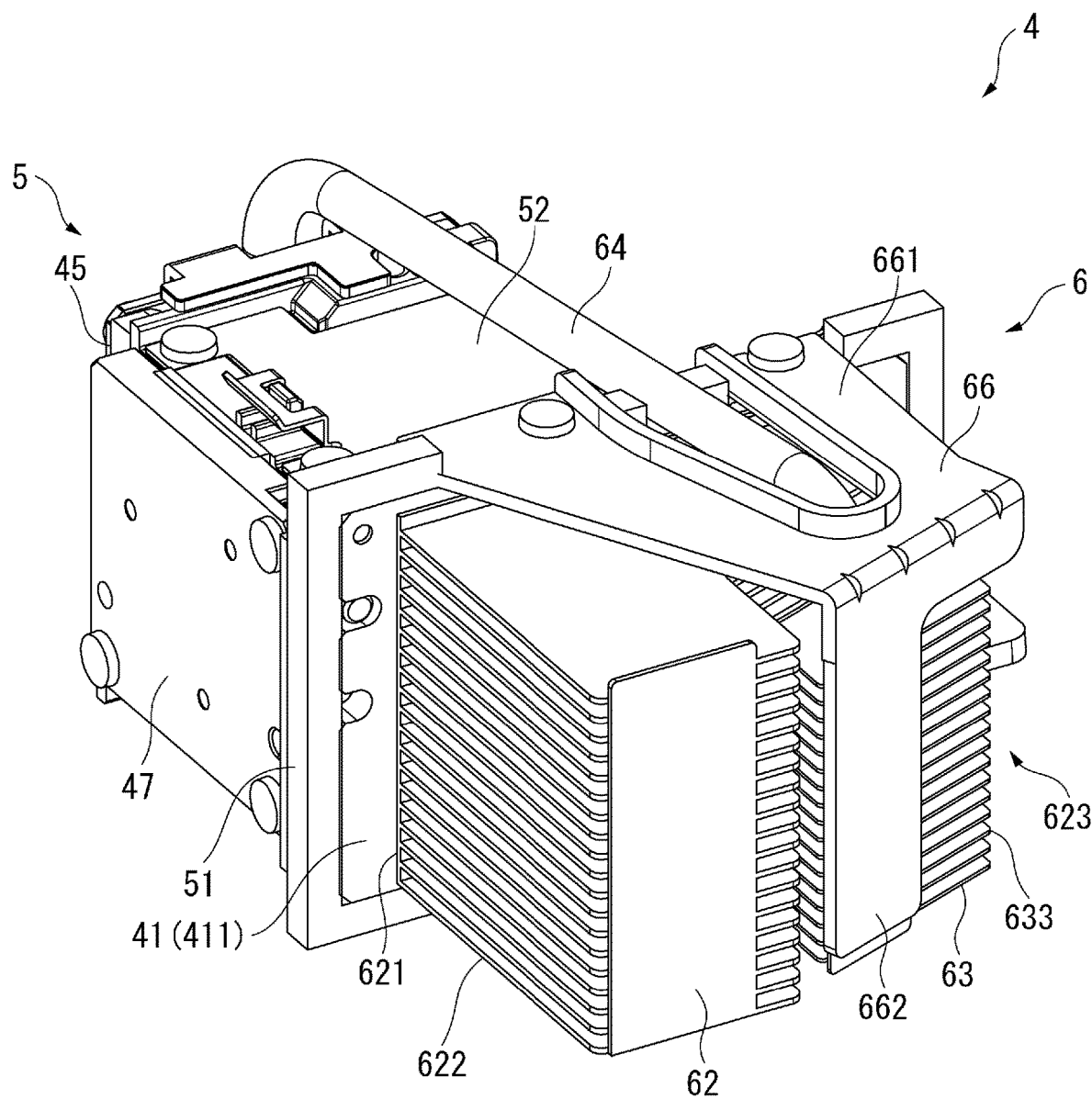
FIG. 7 is a perspective view showing the cooler excluding the duct and the cooling fan in the embodiment.

The cooler 6 includes the duct 61, the first heat dissipation member 62, a second heat dissipation member 63, the heat transport member 64, the cooling fan 65, and an attachment member 66 (see FIGS. 6 and 7).

Configuration of Duct

The duct 61 accommodates the first heat dissipation member 62, the second heat dissipation member 63, and the cooling fan 65 and covers the first heat dissipation member 62, the second heat dissipation member 63, and the cooling fan 65. The duct 61 causes the cooling gas sent from the cooling fan 65 to flow through the first heat dissipation member 62 and the second heat dissipation member 63. The duct 61 extends along the direction +Z and is so disposed as to be connected to the first side surface section 511 of the support member 5. The duct 61 has a partition 611 and an opening 612.

The partition 611 partitions the duct 61 into a heat dissipation member placement section 61A, which is located in the direction −Z and where the first heat dissipation member 62 and the second heat dissipation member 63 are placed, and a fan placement section 61B, which is located in the direction +Z and where the cooling fan 65 is placed. A feed port 652 of the cooling fan 65 is connected to the partition 611. The partition 611 prevents part of the cooling gas sent from the cooling fan 65 disposed in the fan placement section 61B into the heat dissipation member placement section 61A from flowing back into the fan placement section 61B.

The opening 612 is a communication port via which the heat dissipation member placement section 61A communicates with the space outside the duct 61. The opening 612 opens in an intersection direction that intersects a flow direction DR (see FIG. 8) of the cooling gas sent toward the first heat dissipation member 62 and the second heat dissipation member 63. Although will be described later in detail, the cooling gas having been sent from the cooling fan 65 and having cooled the first heat dissipation member 62 and the second heat dissipation member 63 is discharged out of the duct 61 via the opening 612. The cooling gas discharged out of the duct 61 is discharged out of the exterior enclosure 2 via the discharge port 212 (see FIG. 1) of the exterior enclosure 2.

The duct 61 has an opening 613, which opens in the direction −Y, as shown in FIG. 5. The portion of the opening 613 excluding the portion corresponding to an intake port 651 of the cooling fan 65 is closed when the light source apparatus 4 is fixed in a predetermined position.

Configuration of First Heat Dissipation Member

FIGS. 6 and 7 are perspective views of the cooler 6 viewed in the directions +Y and +Z with the duct 61 and the cooling fan 65 omitted. FIG. 6 shows the cooler 6 viewed in the direction +X, and FIG. 7 shows the cooler 6 viewed in the direction −X. In FIGS. 6 and 7, only part of a plurality of the fins 622 and 633 are numbered in consideration of clarity.

The first heat dissipation member 62 is disposed at a surface of the substrate 411 of the light source 41, which is fixed to the support member 5, that is the opposite surface from the surface on which the light emitter 412 and the collimator lens 413 are disposed, so that the first heat dissipation member 62 is connected to the light source 41 in a heat transferable manner. In other words, the first heat dissipation member 62 is disposed on the opposite side from the side toward which the light outputted from the light source 41 travels (in direction −Z).

The first heat dissipation member 62 is a heat sink including a base 621, which is connected to the substrate 411, and the plurality of fins 622, as shown in FIGS. 6 and 7. The plurality of fins 622 rise from the base 621 in the direction +Z along the plane XZ and are arranged along the direction +Y. That is, the plurality of fins 622 extend along the intersection direction, which is the direction −X, which intersects the flow direction DR of the cooling gas sent from the cooling fan 65, when viewed along the flow direction DR.

The base 621 is a plate-shaped section to which the heat of the light emitter 412 of the light source 41 is transferred via the substrate 411. The heat transferred to the base 621 is transferred to each of the plurality of fins 622. The cooling fan 65 causes the cooling gas to flow through the gaps between the plurality of fins 622, and the heat transferred to the plurality of fins 622 is transferred to the cooling gas. The first heat dissipation member 62 is thus cooled, and the light source 41 is in turn cooled.

Figure 8:
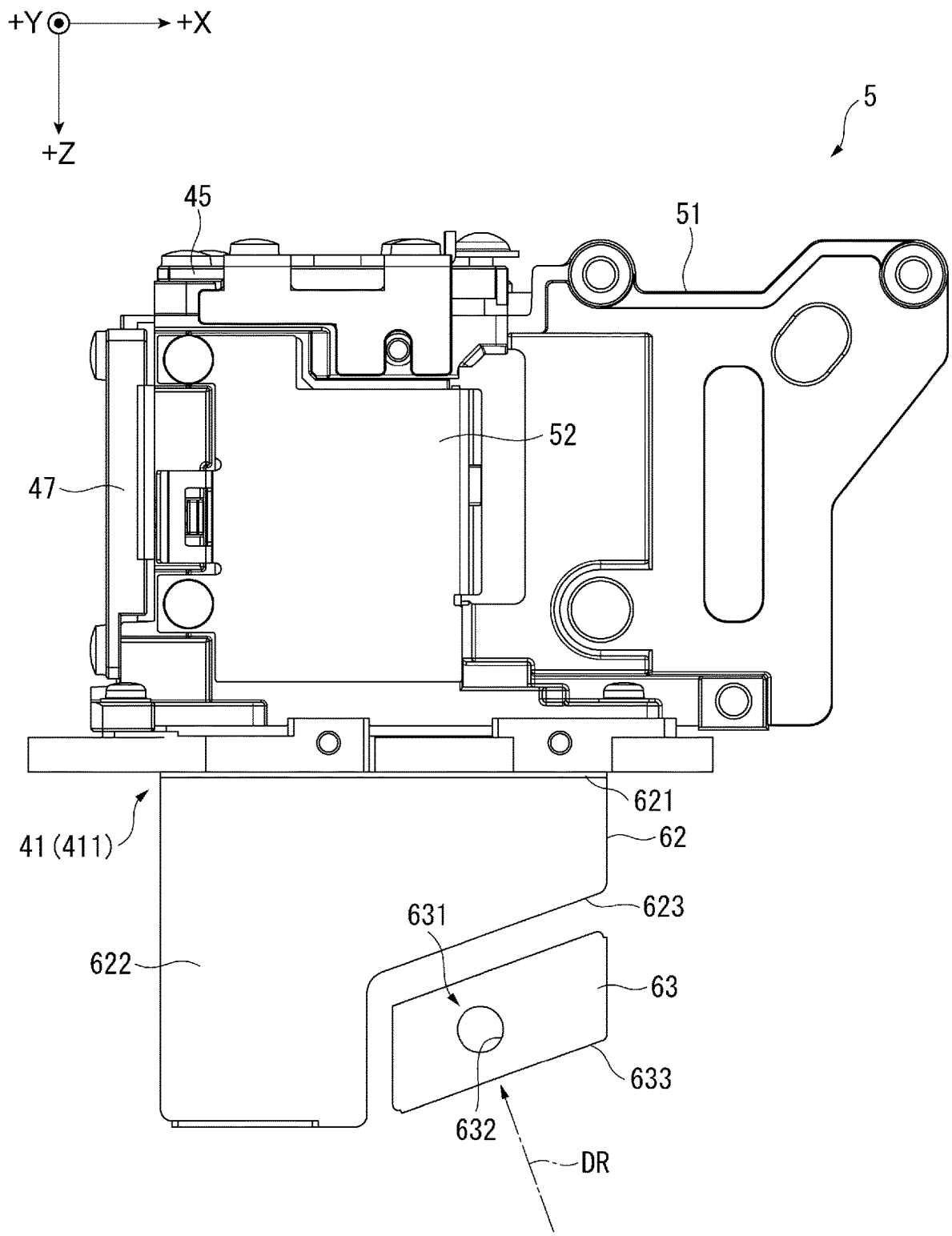
FIG. 8 is a plan view of a first heat dissipation member and a second heat dissipation member in the embodiment.

FIG. 8 is a plan view of the first heat dissipation member 62 and the second heat dissipation member 63 viewed in the direction +Y.

The first heat dissipation member 62 has a recess 623, as shown in FIG. 8.

The recess 623 is a portion of the outer edge of the first heat dissipation member 62 that is the portion in the directions +X and +Z so cut out as to form a recess recessed in the direction −Z. That is, the recess 623 is a portion in which a portion of the outer edge of the first heat dissipation member 62 is cut out when viewed in the direction +Y, which intersects the flow direction DR of the cooling gas sent from the cooling fan 65. In a detailed description, the recess 623 is a portion recessed in the direction −Z in accordance with the shape of the second heat dissipation member 63. The second heat dissipation member 63 is so disposed in the recess 623 as to be separate from the first heat dissipation member 62.

Configuration of Second Heat Dissipation Member

The heat of the wavelength converter 45 is transferred to the second heat dissipation member 63 via the heat transport member 64, and the second heat dissipation member 63 dissipates the transferred heat. That is, the second heat dissipation member 63 is connected to the wavelength converter 45 via the heat transport member 64 in a heat transferable manner. The second heat dissipation member 63 is formed in a substantially parallelogram shape when viewed in direction +Y, as shown in FIG. 8.

The second heat dissipation member 63 is a heat sink including a connection section 631, which is provided with a hole 632, into which an end portion of the heat transport member 64 is fit, and the plurality of fins 633, which extend from the connection section 631 toward the outer side in the radial direction.

The plurality of fins 633 are so formed as to be substantially parallel to the plane XZ and are arranged along the direction +Y, as the plurality of fins 622 are. That is, the plurality of fins 633 extend along the intersection direction, which is the direction −X, which intersects the flow direction DR of the cooling gas sent from the cooling fan 65, when viewed along the flow direction DR.

The heat of the wavelength converter 45 is transferred to the connection section 631 via the heat transport member 64. The heat transferred to the connection section 631 is transferred to each of the plurality of fins 633. The cooling fan 65 causes the cooling gas to flow through the gaps between the plurality of fins 633, and the heat transferred to the plurality of fins 633 is transferred to the cooling gas. The second heat dissipation member 63 is thus cooled, and the wavelength converter 45, which is connected to the second heat dissipation member 63 via the heat transport member 64 in a heat transferable manner, is cooled.

The detailed arrangement of the second heat dissipation member 63 will be described later in detail.

Configuration of Heat Transport Member

The heat transport member 64 connects the wavelength converter 45 to the second heat dissipation member 63 in a heat transferable manner and transports the heat generated in the wavelength converter 45 to the second heat dissipation member 63, as shown in FIGS. 6 and 7. In the present embodiment, the heat transport member 64 is formed of a heat pipe, with one end of the heat pipe connected to the substrate 451 of the wavelength converter 45 in a heat transferable manner and the other end of the heat pipe fit into the hole 632 of the second heat dissipation member 63.

The cooler 6 is provided with one heat transport member 64, and the number of heat transport members 64 can be changed as appropriate in accordance with the amount of heat transported to the second heat dissipation member 63.

The heat transport member 64 connects the wavelength converter 45 to the second heat dissipation member 63 in such a way that a central portion of the heat transport member 64 is located in the direction +Y with respect to the support member 5, but not necessarily. The central portion of the heat transport member 64 may be disposed in the direction −Y or −X with respect to the support member 5 or may be disposed in the direction +X with respect to the support member 5 as long as the thus disposed heat transport member 64 does not block the light outputted from the light source apparatus 4.

Configuration of Attachment Member

The attachment member 66 attaches the second heat dissipation member 63 to the support member 5 with the first heat dissipation member 62 sandwiched therebetween, as shown in FIGS. 6 and 7, and the attachment member 66 is made of metal in the present embodiment. The attachment member 66 includes a first fixing section 661, which extends along the plane XZ, and a second fixing section 662, which bends at the direction +Z-side end of the first fixing section 661 toward the direction −Y.

The first fixing section 661 is fixed to the support member 5 with a fixture, such as screws.

The second heat dissipation member 63 is fixed to the second fixing section 662. The second fixing section 662 is disposed in the heat dissipation member placement section 61A in a position where the cooling gas sent from the cooling fan 65 does not directly flow toward the second fixing section 662.

The thus configured attachment member 66 also has the function of suppressing deformation of the heat transport member 64, which is integrated with the second heat dissipation member 63, due, for example, to accidental fall of the projector 1.

Configuration of Cooling Fan

The cooling fan 65 sucks the air introduced into the exterior enclosure 2 as the cooling air and sends the sucked cooling gas to the first heat dissipation member 62 and the second heat dissipation member 63. In a detailed description, the cooling fan 65 is placed in the fan placement section 61B in the duct 61, as shown in FIG. 5, and sends the sucked cooling gas to the first heat dissipation member 62 and the second heat dissipation member 63 placed in the heat dissipation member placement section 61A. The duct 61 thus causes the cooling gas sent from the cooling fan 65 to flow through the first heat dissipation member 62 and the second heat dissipation member 63.

In the present embodiment, the cooling fan 65 is formed of a sirocco fan having the intake port 651, which opens in the direction −Y, and the feed port 652, which opens in the direction −Z. The feed port 652 is disposed in the heat dissipation member placement section 61A and faces the first heat dissipation member 62 and the second heat dissipation member 63.

Figure 9:
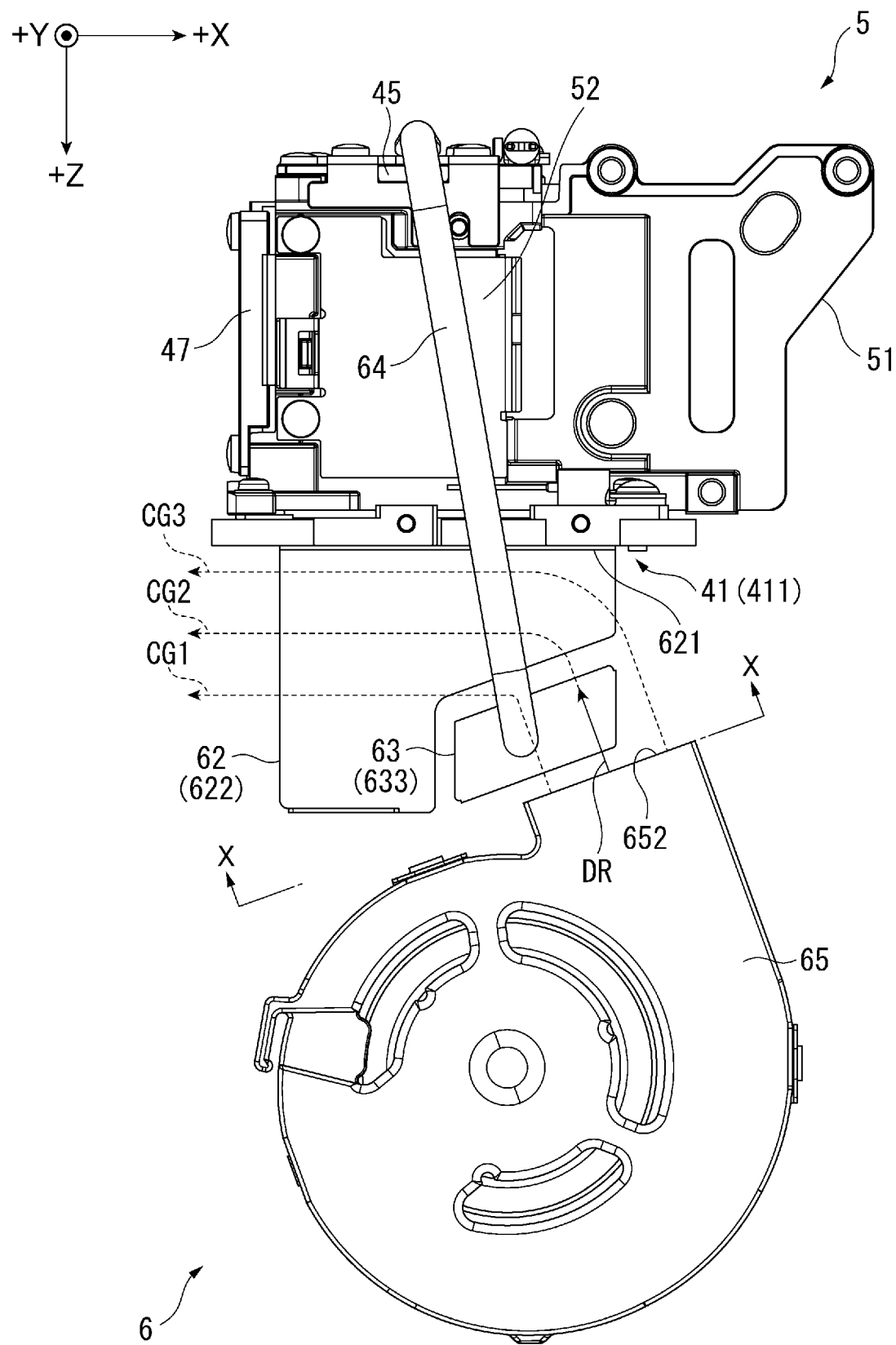
FIG. 9 shows the positional relationship of the first heat dissipation member and the second heat dissipation member with a feed port of the cooling fan.

The flow direction DR of the cooling gas sent by the cooling fan 65 is not parallel to the direction −Z but inclines with respect to the direction −Z in such a way that the cooling gas travels in the direction −X with distance in the direction −Z, as shown in FIG. 9. The inclination of the flow direction DR with respect to the direction −Z will be described later in detail.

Arrangement of Second Heat Dissipation Member

FIG. 9 shows the positional relationship of the first heat dissipation member 62 and the second heat dissipation member 63 with the feed port 652 of the cooling fan 65. In other words, FIG. 9 shows the first heat dissipation member 62, the second heat dissipation member 63, and the cooling fan 65 viewed in the direction +Y. FIG. 10 shows the positional relationship of the cross section of the cooling fan 65 taken along the line X-X shown in FIG. 9 with the first heat dissipation member 62 and the second heat dissipation member 63.

The second heat dissipation member 63 is so disposed as to be adjacent to the first heat dissipation member 62 with a predetermined gap therebetween in the directions −X and −Z, as shown in FIGS. 6 to 9. In a detailed description, the second heat dissipation member 63 is disposed in the directions +X and +Z with respect to the first heat dissipation member 62 with the predetermined gap therebetween. That is, the second heat dissipation member 63 is disposed on the upstream of the first heat dissipation member 62 in the flow direction DR of the cooling gas sent by the cooling fan 65. In other words, the second heat dissipation member 63 is located on the opposite side of the first heat dissipation member 62 from the side toward which the flow direction DR is oriented.

At least part of the second heat dissipation member 63 overlaps with the first heat dissipation member 62 when viewed along the flow direction DR of the cooling gas, as shown in FIGS. 8 to 10. That is, at least part of the second heat dissipation member 63 overlaps with the first heat dissipation member 62 when viewed from the cooling fan 65.

In the present embodiment, the second heat dissipation member 63 is so formed as to be smaller than the first heat dissipation member 62 when viewed from the feed port 652. At least part of the second heat dissipation member 63 therefore overlaps with the first heat dissipation member 62 when viewed from the feed port 652 of the cooling fan 65, as shown in FIG. 10. In a detailed description, the entire second heat dissipation member 63 overlaps with the first heat dissipation member 62 when viewed from the feed port 652.

On the other hand, part of the first heat dissipation member 62 is so disposed as to be shifted from the second heat dissipation member 63 when viewed along the flow direction DR. In a detailed description, the first heat dissipation member is so disposed as to be shifted from the second heat dissipation member 63 in a direction that intersects the flow direction DR of the cooling gas, specifically, in the direction +X.

The second heat dissipation member 63 is so disposed that one edge of the parallelogram shape of the second heat dissipation member 63 is perpendicular to the flow direction DR of the cooling gas when viewed in the direction +Y, which is a direction that intersects the flow direction DR of the cooling gas, as shown in FIGS. 8 and 9.

The thus disposed second heat dissipation member 63 causes cooling gases CG1 and CG2 sent via a portion shifted in the direction −X and a substantially central position in the feed port 652 of the cooling fan 65 to flow to the second heat dissipation member 63. The cooling gases CG1 and CG2 having flowed through the second heat dissipation member 63 passes through the second heat dissipation member 63 and flows through the first heat dissipation member 62.

On the other hand, a cooling gas CG3 sent via a position shifted in the direction +X in the feed port 652 does not flow through the second heat dissipation member 63 but flows through a portion of the first heat dissipation member 62 that is the portion shifted in the direction +X with respect to the second heat dissipation member 63 when viewed along the flow direction DR of the cooling gas.

As described above, the cooling air having just sent from the cooling fan 65 flows through the first heat dissipation member 62 and the second heat dissipation member 63.

The gaps between the plurality of fins 633 in the direction +Y is substantially the same as the gaps between the plurality of fins 622 in the direction +Y. The surface area of the second heat dissipation member 63 is therefore smaller than the surface area of the first heat dissipation member 62. In other words, the surface area of the first heat dissipation member 62 is greater than the surface area of the second heat dissipation member 63. In the present embodiment, the surface area of each of the heat dissipation members is the area of a portion of the base and the plurality of fins that is the portion in contact with the air.

The amount of heat generated by the light source 41, to which the first heat dissipation member 62 is connected, is greater than the amount of heat generated by the wavelength converter 45, to which the second heat dissipation member 63 is connected via the heat transport member 64.

Further, not only does the cooling gas directly sent from the cooling fan 65 flow through the first heat dissipation member 62, but the cooling air having passed through the second heat dissipation member 63 flows through the first heat dissipation member 62. The heat exchange between the first heat dissipation member 62 and the cooling gas is thus facilitated, whereby the first heat dissipation member 62 can be effectively cooled.

Direction in which Cooling Gas Flows Through Each Heat Dissipation Member

The cooling gas having flowed along the plurality of fins 622 of the first heat dissipation member 62 flows toward the base 621 connected to the substrate 411 of the light source 41. The cooling gas having reached the base 621 is discharged out of the duct 61 via the opening 612 located in a position shifted in the direction −X. The direction −X is a direction that intersects the flow direction DR.

A surface of the substrate 411 that is the surface in contact with the base 621 is a surface substantially parallel to the plane XY, and a surface of the base 621 that is the surface to which the cooling gas flows is also a surface substantially parallel to the plane XY. Therefore, if the flow direction DR of the cooling gas sent from the cooling fan 65 is parallel to the direction −Z, that is, if the base 621 is perpendicular to the flow direction DR, the cooling gas having flowed along the fins 622 of the first heat dissipation member 62 collides with the base 621 and can undesirably stay in the vicinity of the base 621. In this case, the efficiency at which the cooling gas is discharged out of the first heat dissipation member 62 lowers, and the efficiency at which the first heat dissipation member 62 is cooled can undesirably lower.

In contrast, the flow direction DR of the cooling gas inclines with respect to the direction −Z in such a way that the cooling gas travels in the direction −X with distance in the direction −Z.

The cooling gas having collided with the base 621 can thus be guided in the direction −X along the base 621, whereby the cooling gas can be readily discharged out of the duct 61 via the opening 612. The efficiency at which the cooling gas having cooled the first heat dissipation member 62 and the second heat dissipation member 63 is discharged out of the duct 61 can therefore be increased.

Effects of Embodiment

The projector 1 according to the present embodiment described above can provide the following effects.

The light source apparatus 4 of the projector 1 includes the light source 41, which serves as the first optical element that outputs light, the wavelength converter 45, which serves as the second optical element that outputs light, the support member 5, the first heat dissipation member 62, the second heat dissipation member 63, the heat transport member 64, and the cooling fan 65.

The support member 5 supports the light source 41 and the wavelength converter 45. The light source 41 and the wavelength converter 45 are fixed to the support member 5.

The first heat dissipation member 62 is connected to the light source 41 in a heat transferable manner.

The heat of the wavelength converter 45 is transferred to the second heat dissipation member 63.

The heat transport member 64 transports the heat of the wavelength converter 45 to the second heat dissipation member 63.

The cooling fan 65 sends the cooling gas to both the first heat dissipation member 62 and the second heat dissipation member 63.

The first heat dissipation member 62 is disposed on the opposite side from the side toward which the light outputted from the light source 41 travels.

The second heat dissipation member 63 is so disposed as to be adjacent to the first heat dissipation member 62 with a gap therebetween. At least part of the second heat dissipation member 63 overlaps with the first heat dissipation member 62 when viewed along the flow direction DR of the cooling gas sent to the first heat dissipation member 62 and the second heat dissipation member 63.

According to the configuration described above, in which the first heat dissipation member 62, to which the heat of the light source 41 is transferred, and the second heat dissipation member 63, to which the heat of the wavelength converter 45 is transferred, are so disposed as to be separate from each other, the cooling balance between the first heat dissipation member 62 and the second heat dissipation member 63 and in turn the cooling balance between the light source 41 and the wavelength converter 45 can be readily adjusted.

At least part of the second heat dissipation member 63 overlaps with the first heat dissipation member 62 when viewed along the flow direction DR of the cooling gas sent to the first heat dissipation member 62 and the second heat dissipation member 63. The cooling gas sent from the cooling fan 65 can therefore flow through the first heat dissipation member 62 and the second heat dissipation member 63. The first heat dissipation member 62 and the second heat dissipation member 63 and in turn the light source 41 and the wavelength converter 45 can therefore be cooled. Further, an increase in the size of the light source apparatus 4 can be suppressed as compared with a case where the first heat dissipation member 62 and the second heat dissipation member 63 are so disposed as not to overlap with each other and as to be separate from each other when viewed along the flow direction DR of the cooling gas.

The amount of heat generated by the light source 41 as the first optical element is greater than the amount of heat generated by the wavelength converter 45 as the second optical element.

According to the configuration described above, the heat transport member 64 transports the heat of the wavelength converter 45, which generates a smaller amount of heat than the amount of heat generated by the light source 41, to the second heat dissipation member 63. The number of heat transport members 64 necessary to cool the optical elements can therefore be reduced as compared with a case where the heat transport member 64 transports the heat of the light source 41, which generates a great amount of heat. Therefore, an increase in manufacturing cost of the light source apparatus 4 can be suppressed, and an increase in the size of the light source apparatus 4 can also be suppressed.

The surface area of the first heat dissipation member is greater than the surface area of the second heat dissipation member 63.

According to the configuration described above, the cooling gas can readily cool the first heat dissipation member, to which a greater amount of heat is transferred than to the second heat dissipation member 63. That is, the configuration described above can facilitate the heat exchange between the heat transferred to the first heat dissipation member 62 and the cooling gas flowing through the first heat dissipation member 62. The first heat dissipation member 62 and in turn the light source 41 can be cooled at increased efficiency.

The second heat dissipation member 63 is located on the upstream of the first heat dissipation member 62 in the flow direction DR of the cooling gas. That is, the second heat dissipation member 63 is disposed in the opposite direction of the first heat dissipation member 62 from the side toward which the flow direction DR of the cooling gas is oriented.

According to the configuration described above, instead of the cooling gas having flowed through the first heat dissipation member 62, the cooling gas having a relatively low temperature can flow through the second heat dissipation member 63. The second heat dissipation member 63 and in turn the wavelength converter 45 can therefore be effectively cooled. The wavelength converter 45, which requires a larger degree of cooling than the light source 41 does, can therefore be effectively cooled, whereby the light source apparatus 4 can be stably used.

The light source apparatus 4 includes the light source 41, which serves as the first optical element and outputs light, and the wavelength converter 45, which serves as the second optical element and converts the light that is outputted from the light source 41 and belongs to the first wavelength band into light that belongs to the second wavelength band different from the first wavelength band.

According to the configuration described above, the cooling balance between the light source 41 and the wavelength converter 45 can be readily adjusted, and the efficiency at which the light source 41 and the wavelength converter 45 are cooled can be increased.

The light source apparatus 4 includes the attachment member 66, which attaches the second heat dissipation member 63 to the support member 5 with the first heat dissipation member 62 sandwiched therebetween.

According to the configuration described above, the second heat dissipation member 63 can be so attached to the support member 5, which supports the light source 41, the wavelength converter 45, and the first heat dissipation member 62, that the second heat dissipation member 63 is located on the upstream of the first heat dissipation member 62 in the flow direction DR of the cooling gas. The second heat dissipation member 63 can therefore be stably disposed.

The first heat dissipation member 62 has the recess 623 in which a portion of the outer edge of the first heat dissipation member 62 is cut out when viewed in the direction +Y, which is a direction that intersects the flow direction DR of the cooling gas. The second heat dissipation member 63 is disposed in the recess 623.

According to the configuration described above, the first heat dissipation member 62 and the second heat dissipation member 63 can be disposed in a compact arrangement. An increase in the size of the light source apparatus 4 can therefore be suppressed.

Part of the first heat dissipation member 62 is so disposed as to be shifted from the second heat dissipation member 63 when viewed along the flow direction DR. In a detailed description, part of the first heat dissipation member 62 is so disposed as to be shifted in the direction +X from the second heat dissipation member 63 when viewed along the flow direction DR.

According to the configuration described above, the cooling gas that does not flow through the second heat dissipation member 63 can flow through the first heat dissipation member 62. That is, cooling gas having a relatively low temperature can flow through not only the second heat dissipation member 63 but the first heat dissipation member 62. The first heat dissipation member 62 and in turn the light source 41 can therefore be cooled at increased efficiency.

Further, the flow direction DR of the cooling gas sent by the cooling fan 65 inclines with respect to the direction −Z, as described above, and the opening 612, via which the cooling gas is discharged out of the duct 61, is shifted in the direction −X with respect to the first heat dissipation member 62. The cooling gas that flows from the feed port 652 through the first heat dissipation member 62 not via the second heat dissipation member 63 and has a low temperature can therefore flow through the first heat dissipation member 62 across the portion from the +X-direction-side end to the −X-direction-side end. The first heat dissipation member 62 and in turn the light source 41 can therefore be cooled at further increased efficiency.

The light source apparatus 4 includes the duct 61, which covers the first heat dissipation member 62 and the second heat dissipation member 63. The duct 61 causes the cooling gas sent from the cooling fan 65 to flow through the first heat dissipation member 62 and the second heat dissipation member 63.

According to the configuration described above, the cooling gas sent from the cooling fan 65 can efficiently flow through the first heat dissipation member 62 and the second heat dissipation member 63. Undesirable diffusion of the cooling gas that flows through the first heat dissipation member 62 and the second heat dissipation member 63, which occurs when no duct 61 is provided, can therefore be suppressed. The first heat dissipation member 62 and the second heat dissipation member 63 and in turn the light source 41 and the wavelength converter 45 can therefore be cooled at increased efficiency.

The duct 61 has the opening 612, which opens in the direction −X, which is a direction that intersects the flow direction DR of the cooling gas, and via which the cooling gas having been sent from the cooling fan 65 and having cooled the first heat dissipation member 62 and the second heat dissipation member 63 is discharged. The first heat dissipation member 62 and the second heat dissipation member 63 include the plurality of fins 622 and 633, which extend along the direction −X when viewed along the flow direction DR of the cooling gas.

According to the configuration described above, the flow direction of the cooling gas having flowed through the first heat dissipation member 62 and the second heat dissipation member 63 is changed to the direction toward the opening 612. An increase in the size of the light source apparatus 4 can thus be suppressed as compared with a case where the flow direction is not changed and the cooling gas having cooled the first heat dissipation member 62 and the second heat dissipation member 63 travels straight.

In this process, the cooling gas can readily flow through the gaps between the plurality of fins 622 and 633 because the direction in which the plurality of fins 622 and 633 extend is oriented toward the opening 612 when viewed along the flow direction DR of the cooling gas. Further, the cooling gas heated by the plurality of fins 622 and 633 can be quickly discharged. The heat dissipation members 62 and 63 and in turn the light source 41 and the wavelength converter 45 can therefore be cooled at increased efficiency.

The projector 1 includes the light source apparatus 4, the light modulators 343, which modulate the light outputted from the light source apparatus 4, and the projection optical apparatus 36, which projects the light modulated by the light modulators 343.

The configuration described above can provide the same effects as those provided by the light source apparatus 4 described above. Further, since the light source apparatus 4 can stably emit light, the projector 1 can be stably operated. Moreover, since the life of each of the light source 41 and the wavelength converter 45 can be prolonged, the life of the projector 1 can be prolonged.

Variations of Embodiment

The present disclosure is not limited to the embodiment described above, and variations, improvements, and other modifications to the extent that the advantage of the present disclosure is achieved fall within the scope of the present disclosure.

In the embodiment described above, the first optical element is the light source 41, and the second optical element is the wavelength converter 45, but not necessarily. The first optical element, which transfers heat to the first heat dissipation member 62, and the second optical element, which transfers heat to the second heat dissipation member 63, may each have another configuration.

For example, conversely, the first optical element may be the wavelength converter 45, and the second optical element may be the light source 41, unlike in the embodiment described above. Instead, the first optical element may be the light source 41, and the second optical element may be the diffusive reflector 47. Still instead, the first optical element may be the diffusive reflector 47, and the second optical element may be the light source 41.

In the embodiment described above, the second heat dissipation member 63 is so disposed as to be adjacent to the first heat dissipation member 62 in the direction +X, but not necessarily. The second heat dissipation member 63 may be adjacent to the first heat dissipation member 62 in the direction +Y as long as at least part of the second heat dissipation member 63 overlaps with the first heat dissipation member 62 in the cooling gas flow range when viewed along the flow direction DR of the cooling gas.

The entire second heat dissipation member 63 does not need to overlap with the first heat dissipation member 62 when viewed along the flow direction DR of the cooling gas, and at least part of the second heat dissipation member 63 only needs to overlap with the first heat dissipation member 62.

In the embodiment described above, the second heat dissipation member 63 is so disposed that a space is provided between the first heat dissipation member 62 and the second heat dissipation member 63 in the directions −X and −Z, but not necessarily. The second heat dissipation member 63 only needs to be so disposed as to be separate from the first heat dissipation member 62.

In the embodiment described above, the amount of heat generated by the light source 41, which is the first optical element, is greater than the amount of heat generated by the wavelength converter 45, which is the second optical element, but not necessarily. The amount of heat generated by the first optical element may be smaller than or equal to the amount of heat generated by the second optical element.

In the embodiment described above, the surface area of the first heat dissipation member 62 is greater than the surface area of the second heat dissipation member 63, but not necessarily. The surface area of the first heat dissipation member connected to the first optical element may be smaller than or equal to the surface area of the second heat dissipation member 63 connected to the second optical element via the heat transport member.

In the embodiment described above, the second heat dissipation member 63 is located on the upstream of the first heat dissipation member 62 in the flow direction DR of the cooling gas, but not necessarily. The first heat dissipation member 62 may be located on the upstream of the second heat dissipation member 63 in the flow direction DR of the cooling gas.

In the embodiment described above, the attachment member 66 attaches the second heat dissipation member 63 to the support member 5 with the first heat dissipation member 62 sandwiched therebetween, but not necessarily. For example, the second heat dissipation member 63 may be fixed to the support member 5 with the second heat dissipation member 63 fixed to heat transport member 64 and the heat transport member 64 fixed to the support member 5. That is, the attachment member 66 may be omitted.

In the embodiment described above, the first heat dissipation member 62 has the recess 623, in which the second heat dissipation member 63 is so disposed as to be separate from the first heat dissipation member 62, but not necessarily. The recess 623 may be omitted. The position of the recess 623 in the first heat dissipation member 62 is not limited to the position described above and may be another position.

In the embodiment described above, part of the first heat dissipation member 62 is shifted from the second heat dissipation member 63 when viewed along the flow direction DR of the cooling gas, but not necessarily. The entirety of one of the first heat dissipation member 62 and the second heat dissipation member 63 may overlap with the other heat dissipation member in the cooling gas flow range when viewed along the flow direction DR of the cooling gas. That is, the first heat dissipation member and the second heat dissipation member may be so disposed that the cooling gas having flowed through the upstream one of the first and second heat dissipation members in the flow direction of the cooling gas flows through the downstream heat dissipation member in the flow direction of the cooling gas and the cooling gas not having flowed through the upstream heat dissipation member in the flow direction does not flow through the downstream heat dissipation member in the flow direction.

In the embodiment described above, the duct 61 covers the first heat dissipation member 62 and the second heat dissipation member 63 and causes the cooling gas sent from the cooling fan 65 to flow through the first heat dissipation member and the second heat dissipation member 63, but not necessarily. The duct 61 may be omitted. Even when the duct 61 is provided, the cooling fan 65 may not be provided in the duct 61.

The cooling fan 65 may not be located on the upstream of the first heat dissipation member 62 and the second heat dissipation member 63 in the flow direction DR of the cooling gas, that is, the opposite side from the side to which the flow direction DR is oriented. For example, the cooling fan may be located on the side toward which the cooling gas that flows through the first heat dissipation member and the second heat dissipation member travels. In this case, the cooling fan may suck the cooling gas to cause the cooling gas to flow through the first heat dissipation member and the second heat dissipation member. The cooling fan in this case may be an axial fan.

In the embodiment described above, the duct 61 has the opening 612, via which the cooling gas having flowed through the first heat dissipation member 62 and the second heat dissipation member 63 is discharged. In the configuration described above, the cooling gas having flowed through the first heat dissipation member 62 and the second heat dissipation member 63 may flow through another cooling target.

The position of the opening 612 may be changed as appropriate. For example, the opening 612 may be shifted in the direction +Y or −Y from the first heat dissipation member 62 and the second heat dissipation member 63, and in this case, the plurality of fins 622 and 633 may extend along the plane YZ.

In the embodiment described above, a heat pipe is employed as the heat transport member 64, but not necessarily. In place of the heat transport member 64, a heat transport member other than a heat pipe may be employed in the light source apparatus 4.

In the embodiment described above, the substrate 451, the wavelength conversion layer 452, and the reflection layer 453 of the wavelength converter 45 and at least part of the lens 442 of the first light collector 44 are disposed in positions outside the support member 5, as shown in FIGS. 2 and 3, but not necessarily. At least part or entirety of the substrate 451, the wavelength conversion layer 452, the reflection layer 453, and the lens 442 may be disposed in the support member 5.

Similarly, in the embodiment described above, the substrate 471 and the diffusive reflection layer 472 of the diffusive reflector 47 and at least part of the lens 462 of the second light collector 46 are disposed in positions outside the support member 5, but not necessarily. At least part or entirety of the substrate 471, the diffusive reflection layer 472, and the lens 462 may be disposed in the support member 5.

In the embodiment described above, the projector 1 includes the image projection apparatus 3 including the optical parts and having the layout thereof shown in FIG. 1, and the image projection apparatus 3 includes the light source apparatus 4 shown in FIG. 2, but not necessarily. The configuration and layout of the optical parts provided in the image projection apparatus 3 can be changed as appropriate, and the configuration and layout of the optical parts provided in the light source apparatus 4 can be changed as appropriate. For example, the wavelength converter 45 provided in the light source apparatus 4 is a reflective wavelength converter that outputs the fluorescence generated in the wavelength conversion layer 452 toward the side on which the blue light is incident, and a transmissive wavelength converter that outputs the fluorescence along the direction in which the blue light is incident may be employed in the light source apparatus.

In the embodiment described above, the light source 41 of the light source apparatus 4 includes the light emitter 412 formed of semiconductor lasers, but not necessarily. The light source apparatus 4 may include a light source lamp, such as an ultrahigh-pressure mercury lamp, or another type of solid-state light source, such as an LED, as the light source. The light source apparatus 4 may instead include another type of solid-state light source, such as LDs or LEDs that output red, green, and blue light, or another type of light source lamp, such as lamps that output red, green, and blue light, as the light source. In this case, the cooling target of the cooler 6 may include the other type of solid-state light source or light source lamp.

In the embodiment described above, the projector 1 includes the three light modulators 343B, 343G, and 343R, but not necessarily. The present disclosure is also applicable to a projector including two or less or four or more light modulators.

In the embodiment described above, the light modulators 343 are each a transmissive liquid crystal panel having a light incident surface and a light exiting surface different from each other, but not necessarily. The light modulators may each be a reflective liquid crystal panel having a surface that serves both as the light incident surface and the light exiting surface. Further, a light modulator using any component other than a liquid-crystal-based component and capable of modulating an incident light flux to form an image according to image information, such as a device using micromirrors, for example, a digital micromirror device (DMD), may be employed.

In the embodiment described above, the projector 1 is presented byway of example as the configuration including the light source apparatus according to the present disclosure, but not necessarily. The light source apparatus may be used as a standalone apparatus, and the light source apparatus according to the present disclosure may be used in an electronic instrument and apparatus other than a projector.

Overview of Present Disclosure

The present disclosure will be overviewed below as additional remarks.

A light source apparatus according to a first aspect of the present disclosure includes a first optical element that outputs light, a second optical element that outputs light, a support member to which the first optical element and the second optical element are fixed and which supports the first optical element and the second optical element, a first heat dissipation member to which the first optical element is connected in a heat transferable manner, a second heat dissipation member to which heat of the second optical element is transferred, a heat transport member that transports the heat of the second optical element to the second heat dissipation member, and a cooling fan that sends a cooling gas to both the first heat dissipation member and the second heat dissipation member. The first heat dissipation member is disposed on the opposite side from the direction toward which the light outputted from the first optical element travels. The second heat dissipation member is so disposed as to be adjacent to the first heat dissipation member with a gap therebetween. At least part of the second heat dissipation member overlaps with the first heat dissipation member when viewed along the flow direction of the cooling gas sent to the first heat dissipation member and the second heat dissipation member.

According to the configuration described above, in which the first heat dissipation member, to which the heat of the first optical element is transferred, and the second heat dissipation member, to which the heat of the second optical element is transferred, are so disposed as to be separate from each other, the cooling balance between the first heat dissipation member and the second heat dissipation member and in turn the cooling balance between the first optical element and the second optical element can be readily adjusted.

At least part of the second heat dissipation member overlaps with the first heat dissipation member when viewed along the flow direction of the cooling gas sent to the first heat dissipation member and the second heat dissipation member. The cooling gas can therefore flow through the first heat dissipation member and the second heat dissipation member. The first heat dissipation member and the second heat dissipation member and in turn the first optical element and the second optical element can therefore be cooled. Further, an increase in the size of the light source apparatus can be suppressed as compared with the case where the first heat dissipation member and the second heat dissipation member are so disposed as not to overlap with each other and as to be separate from each other when viewed along the flow direction of the cooling gas.

In the first aspect described above, the amount of heat generated by the first optical element may be greater than the amount of heat generated by the second optical element.

According to the configuration described above, the heat transport member transports the heat of the second optical element, which generates a smaller amount of heat than the amount of heat generated by the first optical element, to the second heat dissipation member. The number of heat transport members necessary to cool the optical elements can therefore be reduced as compared with the case where the heat transport member transports the heat of the first optical element, which generates a great amount of heat. Therefore, an increase in manufacturing cost of the light source apparatus can be suppressed, and an increase in the size of the light source apparatus can be suppressed.

In the first aspect described above, the surface area of the first heat dissipation member may be greater than the surface area of the second heat dissipation member.

According to the configuration described above, the cooling gas can readily cool the first heat dissipation member, to which a greater amount of heat is transferred than to the second heat dissipation member. That is, the configuration described above can facilitate heat exchange between the heat transferred to the first heat dissipation member and the cooling gas flowing through the first heat dissipation member. The first heat dissipation member and in turn the first optical element can therefore be cooled at increased efficiency.

In the first aspect described above, the second heat dissipation member may be disposed on the upstream of the first heat dissipation member in the flow direction.

According to the configuration described above, instead of the cooling gas having flowed through the first heat dissipation member, the cooling gas having a relatively low temperature can flow through the second heat dissipation member. The second heat dissipation member and in turn the second optical element can therefore be effectively cooled. In particular, when the degree of requirement of cooling of the second optical element is greater than the degree of requirement of cooling of the first optical element, the second optical element can be effectively cooled, whereby the light source apparatus can be stably used.

In the first aspect described above, the first optical element may be a light source that outputs light, and the second optical element may be a wavelength converter that converts the light that is outputted from the light source and belongs to a first wavelength band into light that belongs to a second wavelength band different from the first wavelength band.

According to the configuration described above, the cooling balance between the light source and the wavelength converter can be readily adjusted, and the efficiency at which the light source and the wavelength converter are cooled can be increased.

In the first aspect described above, the light source apparatus may further include an attachment member that attaches the second heat dissipation member to the support member with the first heat dissipation member sandwiched therebetween.

According to the configuration described above, the second heat dissipation member can be so attached to the support member, which supports the first optical element, the second optical element, and the first heat dissipation member, that the second heat dissipation member is located on the upstream of the first heat dissipation member in the flow direction of the cooling gas. The second heat dissipation member can therefore be stably disposed.

In the first aspect described above, the first heat dissipation member may have a recess in which a portion of the outer edge of the first heat dissipation member is cut out when viewed in a direction that intersects the flow direction, and the second heat dissipation member may be disposed in the recess.

According to the configuration described above, the first heat dissipation member and the second heat dissipation member can be disposed in a compact arrangement. An increase in the size of the light source apparatus can therefore be suppressed.

In the first aspect described above, part of the first heat dissipation member may be shifted from the second heat dissipation member when viewed along the flow direction.

According to the configuration described above, the cooling gas that does not flow through the second heat dissipation member can flow through the first heat dissipation member. That is, cooling gas having a relatively low temperature can flow through not only the second heat dissipation member but the first heat dissipation member. The first heat dissipation member and in turn the first optical element can therefore be cooled at increased efficiency.

In the first aspect described above, the light source apparatus may further include a duct that covers the first heat dissipation member and the second heat dissipation member and causes the cooling gas sent from the cooling fan to flow through the first heat dissipation member and the second heat dissipation member.

According to the configuration described above, the cooling gas sent from the cooling fan can effectively flow through the first heat dissipation member and the second heat dissipation member. Undesirable diffusion of the cooling gas that flows through the first heat dissipation member and the second heat dissipation member, which occurs when no duct is provided, can therefore be suppressed. The first heat dissipation member and the second heat dissipation member and in turn the first optical element and the second optical element can therefore be cooled at increased efficiency.

In the first aspect described above, the duct may have an opening which opens in an intersection direction that intersects the flow direction and via which the cooling gas having been sent from the cooling fan and having cooled the first heat dissipation member and the second heat dissipation member is discharged, and the first heat dissipation member and the second heat dissipation member may each include a plurality of fins that extend along the intersect direction when viewed along the flow direction.

According to the configuration described above, the flow direction of the cooling gas having flowed through the first heat dissipation member and the second heat dissipation member is changed to the direction toward the opening. An increase in the size of the light source apparatus can thus be suppressed as compared with the case where the flow direction is not changed but the cooling gas having cooled the first heat dissipation member and the second heat dissipation member travels straight.

In this process, the cooling gas can readily flow through the gaps between the plurality of fins, and the cooling gas heated by the plurality of fins can be readily discharged because the direction in which the plurality of fins extend is oriented toward the opening. The heat dissipation members and in turn the optical elements can therefore be cooled at increased efficiency.

A projector according to a second aspect of the present disclosure includes the light source apparatus described above, a light modulator that modulates the light outputted from the light source apparatus, and a projection optical apparatus that projects the light modulated by the light modulator.

The configuration described above can provide the same effects as those provided by the light source apparatus according to the first aspect. Further, the light source apparatus can stably emit light, whereby the projector can be stably operated. Moreover, since the life of each of the first optical element and the second optical element can be prolonged, the life of the projector can be prolonged.

What is claimed is:

1. A light source apparatus comprising:
a first optical element that outputs light;
a second optical element that outputs light;
a support member to which the first optical element and the second optical element are fixed and which supports the first optical element and the second optical element;
a first heat dissipation member to which the first optical element is connected in a heat transferable manner;
a second heat dissipation member to which heat of the second optical element is transferred;
a heat transport member that transports the heat of the second optical element to the second heat dissipation member;
and a cooling fan that sends a cooling gas to both the first heat dissipation member and the second heat dissipation member,
wherein the first heat dissipation member is disposed on an opposite side from a direction toward which the light outputted from the first optical element travels,
the second heat dissipation member is so disposed as to be adjacent to the first heat dissipation member with a gap therebetween,
at least part of the second heat dissipation member overlaps with the first heat dissipation member when viewed along a flow direction of the cooling gas sent to the first heat dissipation member and the second heat dissipation member,
a part of the cooling fan is disposed on the opposite side from the direction toward which the light outputted from the first optical element travels, and
the first heat dissipation member is between the part of the cooling fan and the first optical element in the direction toward which the light outputted from the first optical element travels.

2. The light source apparatus according to claim 1, wherein an amount of heat generated by the first optical element is greater than an amount of heat generated by the second optical element.

3. The light source apparatus according to claim 2, wherein a surface area of the first heat dissipation member is greater than a surface area of the second heat dissipation member.

4. The light source apparatus according to claim 1, wherein the second heat dissipation member is disposed on an upstream of the first heat dissipation member in the flow direction.

5. The light source apparatus according to claim 4, wherein the first optical element is a light source that outputs light, and
the second optical element is a wavelength converter that converts the light that is outputted from the light source and belongs to a first wavelength band into light that belongs to a second wavelength band different from the first wavelength band.

6. The light source apparatus according to claim 4, further comprising an attachment member that attaches the second heat dissipation member to the support member with the first heat dissipation member sandwiched therebetween.

7. The light source apparatus according to claim 1, wherein part of the first heat dissipation member is shifted from the second heat dissipation member when viewed along the flow direction.

8. The light source apparatus according to claim 1, further comprising a duct that covers the first heat dissipation member and the second heat dissipation member and causes the cooling gas sent from the cooling fan to flow through the first heat dissipation member and the second heat dissipation member.

9. A projector comprising:
the light source apparatus according to claim 1;
a light modulator that modulates light outputted from the light source apparatus; and
a projection optical apparatus that projects the light modulated by the light modulator.

10. A light source apparatus comprising:
a first optical element that outputs light;
a second optical element that outputs light;
a support member to which the first optical element and the second optical element are fixed and which supports the first optical element and the second optical element;
a first heat dissipation member to which the first optical element is connected in a heat transferable manner;
a second heat dissipation member to which heat of the second optical element is transferred;
a heat transport member that transports the heat of the second optical element to the second heat dissipation member;
and a cooling fan that sends a cooling gas to both the first heat dissipation member and the second heat dissipation member,
wherein the first heat dissipation member is disposed on an opposite side from a direction toward which the light outputted from the first optical element travels,
the second heat dissipation member is so disposed as to be adjacent to the first heat dissipation member with a gap therebetween,
at least part of the second heat dissipation member overlaps with the first heat dissipation member when viewed along a flow direction of the cooling gas sent to the first heat dissipation member and the second heat dissipation member,
the first heat dissipation member has a recess in which a portion of an outer edge of the first heat dissipation member is cut out when viewed in a direction that intersects the flow direction, and
the second heat dissipation member is disposed in the recess.

11. A light source apparatus comprising:
a first optical element that outputs light;
a second optical element that outputs light;
a support member to which the first optical element and the second optical element are fixed and which supports the first optical element and the second optical element;
a first heat dissipation member to which the first optical element is connected in a heat transferable manner;
a second heat dissipation member to which heat of the second optical element is transferred;
a heat transport member that transports the heat of the second optical element to the second heat dissipation member;
a cooling fan that sends a cooling gas to both the first heat dissipation member and the second heat dissipation member; and
a duct that covers the first heat dissipation member and the second heat dissipation member and causes the cooling gas sent from the cooling fan to flow through the first heat dissipation member and the second heat dissipation member,
wherein the first heat dissipation member is disposed on an opposite side from a direction toward which the light outputted from the first optical element travels,
the second heat dissipation member is so disposed as to be adjacent to the first heat dissipation member with a gap therebetween,
at least part of the second heat dissipation member overlaps with the first heat dissipation member when viewed along a flow direction of the cooling gas sent to the first heat dissipation member and the second heat dissipation member,
the duct has an opening which opens in an intersection direction that intersects the flow direction and via which the cooling gas that is sent from the cooling fan and cools the first heat dissipation member and the second heat dissipation member is discharged, and
the first heat dissipation member and the second heat dissipation member each include a plurality of fins that extend along the intersect direction when viewed along the flow direction.

* * * * *